(12) United States Patent
Crossman et al.

(10) Patent No.: US 12,027,053 B1
(45) Date of Patent: Jul. 2, 2024

(54) METHOD AND SYSTEM FOR ASSESSING AND MITIGATING RISKS ENCOUNTERABLE BY AN AUTONOMOUS VEHICLE

(71) Applicant: May Mobility, Inc., Ann Arbor, MI (US)

(72) Inventors: Jacob Crossman, Ann Arbor, MI (US); Collin Johnson, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 18/538,312

(22) Filed: Dec. 13, 2023

Related U.S. Application Data

(60) Provisional application No. 63/442,636, filed on Feb. 1, 2023, provisional application No. 63/432,137, filed on Dec. 13, 2022.

(51) Int. Cl.
*G08G 1/16* (2006.01)
*B60W 60/00* (2020.01)

(52) U.S. Cl.
CPC ......... *G08G 1/166* (2013.01); *B60W 60/0015* (2020.02); *B60W 2554/4046* (2020.02)

(58) Field of Classification Search
CPC .............. G08G 1/166; B60W 60/0015; B60W 2554/4046
See application file for complete search history.

(56) References Cited

U.S. PATENT DOCUMENTS

| 5,544,282 | A  | 8/1996 | Chen et al. |
| 6,199,013 | B1 | 3/2001 | Oshea |
| 8,949,016 | B1 | 2/2015 | Ferguson et al. |
| 9,129,519 | B2 | 9/2015 | Aoude et al. |
| 9,274,525 | B1 | 3/2016 | Ferguson et al. |
| 9,368,026 | B1 | 6/2016 | Herbach et al. |

(Continued)

FOREIGN PATENT DOCUMENTS

| JP | 2011100492 A | 5/2011 |
| JP | 2015083417 A | 4/2015 |

(Continued)

OTHER PUBLICATIONS

Crossman, Jacob, et al., "Method and System for Assessing and Mitigating Risks Encounterable by an Autonomous Vehicle", U.S. Appl. No. 18/538,312, filed Dec. 13, 2023.

(Continued)

*Primary Examiner* — Donald J Wallace
(74) *Attorney, Agent, or Firm* — Jeffrey Schox; Diana Lin

(57) ABSTRACT

A method 100 assessing and mitigating risks encounterable by an autonomous vehicle includes collecting information associated with an environment of an ego vehicle and determining and assessing a set of risks encounterable by the ego vehicle. A system for assessing and mitigating risks can include and/or interface with an ego vehicle (equivalently referred to herein as an autonomous vehicle, autonomous agent, ego agent, agent, etc.) and a set of computing subsystems (equivalently referred to herein as a set of computers) and/or processing subsystems (equivalently referred to herein as a set of processors), which function to implement any or all of the processes of the method.

20 Claims, 11 Drawing Sheets

(56) References Cited

U.S. PATENT DOCUMENTS

| | | |
|---|---|---|
| 9,495,874 B1 | 11/2016 | Zhu et al. |
| 9,507,346 B1 | 11/2016 | Levinson et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,062,294 B2 | 8/2018 | Kunzi et al. |
| 10,156,848 B1 | 12/2018 | Konrardy et al. |
| 10,235,882 B1 | 3/2019 | Aoude et al. |
| 10,248,120 B1 | 4/2019 | Siegel et al. |
| 10,386,856 B2 | 8/2019 | Wood et al. |
| 10,467,891 B1 | 11/2019 | Bart et al. |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,717,445 B2 | 7/2020 | Michalakis et al. |
| 10,761,542 B1 | 9/2020 | Fairfield et al. |
| 10,796,581 B2 | 10/2020 | Herbach et al. |
| 10,860,019 B2 | 12/2020 | Censi et al. |
| 10,969,470 B2 | 4/2021 | Voorheis et al. |
| 11,003,916 B2 | 5/2021 | Hummelshøj |
| 11,086,318 B1 | 8/2021 | Davis et al. |
| 11,087,200 B2 | 8/2021 | Olson et al. |
| 11,215,982 B1 | 1/2022 | Urano et al. |
| 11,242,054 B2 | 2/2022 | Isele |
| 11,260,855 B2 | 3/2022 | Zhang |
| 11,269,332 B2 | 3/2022 | Vozar et al. |
| 11,281,213 B2 | 3/2022 | Cross et al. |
| 11,300,957 B2 | 4/2022 | Wray et al. |
| 11,352,023 B2 | 6/2022 | Fairley et al. |
| 11,380,108 B1 | 7/2022 | Cai et al. |
| 11,396,302 B2 | 7/2022 | Ye et al. |
| 11,472,436 B1 | 10/2022 | Patel et al. |
| 11,472,444 B2 | 10/2022 | Goeddel et al. |
| 11,496,707 B1 | 11/2022 | Crego et al. |
| 11,554,793 B2 | 1/2023 | Han et al. |
| 11,565,717 B2 | 1/2023 | Kothbauer et al. |
| 11,748,085 B2 | 9/2023 | Fields et al. |
| 11,780,466 B1 | 10/2023 | Shah |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2010/0114554 A1 | 5/2010 | Misra |
| 2010/0204867 A1 | 8/2010 | Longstaff |
| 2010/0228419 A1 | 9/2010 | Lee et al. |
| 2011/0142283 A1 | 6/2011 | Huang et al. |
| 2012/0089275 A1 | 4/2012 | Yao-Chang et al. |
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0277835 A1 | 9/2014 | Filev et al. |
| 2014/0309815 A1 | 10/2014 | Ricci et al. |
| 2015/0105961 A1 | 4/2015 | Callow |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2016/0334230 A1 | 11/2016 | Ross et al. |
| 2017/0031361 A1 | 2/2017 | Olson et al. |
| 2017/0032671 A1 | 2/2017 | Toyama et al. |
| 2017/0072853 A1 | 3/2017 | Matsuoka et al. |
| 2017/0123419 A1 | 5/2017 | Levinson et al. |
| 2017/0155696 A1 | 6/2017 | Dong et al. |
| 2017/0192426 A1 | 7/2017 | Rust |
| 2017/0199523 A1 | 7/2017 | Barton-Sweeney et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0291602 A1 | 10/2017 | Newman et al. |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Iagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0065625 A1 | 3/2018 | Tijerina et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0196427 A1 | 7/2018 | Majumdar et al. |
| 2018/0220283 A1 | 8/2018 | Condeixa et al. |
| 2018/0224851 A1 | 8/2018 | Park |
| 2018/0251126 A1 | 9/2018 | Linscott et al. |
| 2018/0267550 A1 | 9/2018 | Kopetz et al. |
| 2018/0268281 A1 | 9/2018 | Olson et al. |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0027034 A1 | 1/2019 | Xu et al. |
| 2019/0039545 A1 | 2/2019 | Kumar et al. |
| 2019/0042859 A1 | 2/2019 | Schubert et al. |
| 2019/0066399 A1 | 2/2019 | Jiang et al. |
| 2019/0096244 A1 | 3/2019 | Guruva Reddiar et al. |
| 2019/0101914 A1 | 4/2019 | Coleman et al. |
| 2019/0101919 A1 | 4/2019 | Kobilarov et al. |
| 2019/0106117 A1 | 4/2019 | Goldberg |
| 2019/0113919 A1 | 4/2019 | Englard et al. |
| 2019/0113929 A1 | 4/2019 | Mukadam et al. |
| 2019/0130878 A1 | 5/2019 | Bradley |
| 2019/0138007 A1 | 5/2019 | Baghsorkhi et al. |
| 2019/0138524 A1 | 5/2019 | Singh et al. |
| 2019/0147610 A1 | 5/2019 | Frossard et al. |
| 2019/0163176 A1 | 5/2019 | Wang et al. |
| 2019/0180529 A1 | 6/2019 | Smith |
| 2019/0188493 A1 | 6/2019 | Tiziani |
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0235516 A1 | 8/2019 | Zhang et al. |
| 2019/0236950 A1 | 8/2019 | Li et al. |
| 2019/0256096 A1 | 8/2019 | Graf et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271554 A1 | 9/2019 | Colgate et al. |
| 2019/0271981 A1 | 9/2019 | Oba |
| 2019/0329771 A1 | 10/2019 | Wray et al. |
| 2019/0331758 A1 | 10/2019 | Malkes et al. |
| 2019/0332106 A1 | 10/2019 | Belloni Mourao et al. |
| 2019/0337509 A1 | 11/2019 | Shalev-Shwartz et al. |
| 2020/0004241 A1 | 1/2020 | Levinson et al. |
| 2020/0017114 A1 | 1/2020 | Santoni et al. |
| 2020/0020226 A1 | 1/2020 | Stenneth et al. |
| 2020/0026286 A1 | 1/2020 | Vozar et al. |

(56) References Cited

U.S. PATENT DOCUMENTS

| | | |
|---|---|---|
| 2020/0057441 A1 | 2/2020 | Wang et al. |
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0110411 A1 | 4/2020 | Vozar et al. |
| 2020/0122830 A1 | 4/2020 | Anderson et al. |
| 2020/0124447 A1 | 4/2020 | Schwindt et al. |
| 2020/0150661 A1 | 5/2020 | Vozar et al. |
| 2020/0159227 A1 | 5/2020 | Cohen et al. |
| 2020/0189731 A1 | 6/2020 | Mistry et al. |
| 2020/0209846 A1 | 7/2020 | Chen |
| 2020/0209853 A1 | 7/2020 | Leach et al. |
| 2020/0209864 A1 | 7/2020 | Chen |
| 2020/0233060 A1 | 7/2020 | Lull et al. |
| 2020/0255027 A1 | 8/2020 | Kulkarni et al. |
| 2020/0262448 A1 | 8/2020 | Li et al. |
| 2020/0269843 A1 | 8/2020 | Wissing et al. |
| 2020/0290619 A1 | 9/2020 | Mehdi et al. |
| 2020/0293038 A1 | 9/2020 | Laurent et al. |
| 2020/0293041 A1 | 9/2020 | Palanisamy |
| 2020/0294401 A1 | 9/2020 | Kerecsen |
| 2020/0298891 A1 | 9/2020 | Liang et al. |
| 2020/0309543 A1 | 10/2020 | Voznesensky |
| 2020/0310417 A1 | 10/2020 | Pedersen et al. |
| 2020/0339151 A1 | 10/2020 | Batts et al. |
| 2020/0346643 A1 | 11/2020 | Woon et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0379457 A1 | 12/2020 | Ostafew et al. |
| 2020/0400781 A1 | 12/2020 | Voorheis et al. |
| 2020/0401135 A1 | 12/2020 | Chen et al. |
| 2021/0018916 A1 | 1/2021 | Thakur et al. |
| 2021/0042535 A1 | 2/2021 | Abbott et al. |
| 2021/0046924 A1 | 2/2021 | Caldwell et al. |
| 2021/0110484 A1 | 4/2021 | Shalev-Shwartz et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0200207 A1 | 7/2021 | Soryal et al. |
| 2021/0208244 A1 | 7/2021 | Voorheis et al. |
| 2021/0229697 A1 | 7/2021 | Lee et al. |
| 2021/0237759 A1 | 8/2021 | Wray et al. |
| 2021/0245785 A1 | 8/2021 | Suzuki et al. |
| 2021/0252715 A1 | 8/2021 | Javidan et al. |
| 2021/0269063 A1 | 9/2021 | Lee et al. |
| 2021/0286651 A1 | 9/2021 | Ho et al. |
| 2021/0300412 A1 | 9/2021 | Dingli et al. |
| 2021/0323573 A1 | 10/2021 | Gogna |
| 2021/0339741 A1 | 11/2021 | Rezvan Behbahani et al. |
| 2021/0365701 A1 | 11/2021 | Eshet et al. |
| 2021/0389769 A1* | 12/2021 | Hari .................... G05D 1/0214 |
| 2021/0394757 A1 | 12/2021 | Beller et al. |
| 2022/0001892 A1 | 1/2022 | Fairley et al. |
| 2022/0032951 A1 | 2/2022 | Luo et al. |
| 2022/0063674 A1 | 3/2022 | De Francesco et al. |
| 2022/0066440 A1 | 3/2022 | Sucan et al. |
| 2022/0073097 A1 | 3/2022 | Sucan et al. |
| 2022/0076032 A1 | 3/2022 | Jain et al. |
| 2022/0081005 A1 | 3/2022 | Brown et al. |
| 2022/0114406 A1 | 4/2022 | Wyffels |
| 2022/0119006 A1* | 4/2022 | Ariyaratne .......... G01M 17/007 |
| 2022/0126878 A1 | 4/2022 | Moustafa et al. |
| 2022/0144306 A1 | 5/2022 | Narang et al. |
| 2022/0161811 A1 | 5/2022 | Lu et al. |
| 2022/0169263 A1 | 6/2022 | Li et al. |
| 2022/0185325 A1 | 6/2022 | Chen et al. |
| 2022/0194419 A1 | 6/2022 | Houshmand et al. |
| 2022/0198107 A1 | 6/2022 | Pedersen |
| 2022/0204010 A1 | 6/2022 | Zhu et al. |
| 2022/0227389 A1 | 7/2022 | Tam |
| 2022/0230080 A1 | 7/2022 | Isele et al. |
| 2022/0315051 A1 | 10/2022 | Patel et al. |
| 2022/0317695 A1 | 10/2022 | Wang et al. |
| 2022/0348222 A1 | 11/2022 | Zhao et al. |
| 2022/0348223 A1 | 11/2022 | Zhao et al. |
| 2022/0388547 A1 | 12/2022 | Yangel et al. |
| 2023/0005163 A1 | 1/2023 | Kim |
| 2023/0067887 A1 | 3/2023 | Garg et al. |
| 2023/0144745 A1* | 5/2023 | Ulutan .................. G06N 3/044 |
| | | 382/104 |
| 2023/0166764 A1 | 6/2023 | Johnson et al. |
| 2023/0174103 A1 | 6/2023 | Patel et al. |
| 2023/0176573 A1 | 6/2023 | Kumavat et al. |
| 2023/0192134 A1 | 6/2023 | Winter et al. |
| 2023/0194286 A1 | 6/2023 | Winter et al. |
| 2023/0256991 A1 | 8/2023 | Johnson et al. |
| 2024/0067208 A1* | 2/2024 | Shim .................. G06F 11/3688 |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |
| WO | 2021231452 A1 | 11/2021 |

OTHER PUBLICATIONS

Cunningham, A., et al., "MPDM: Multipolicy Decision-Making in Dynamic, Uncertain Environments for Autonomous Driving", Proceedings of the IEEE International Conference on Robotics and Automation (ICRA) (2015).

Galceran, Enric, et al., "Multipolicy Decision-Making for Autonomous Driving via Changepoint-based Behavior Prediction", Proceedings of Robotics: Science and Systems (RSS); Jul. 2015; <https://april.eecs.umich.edu/papers/details.php?name=galceran2015rss> (Year: 2015).

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect Of Pruning On A Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

* cited by examiner

Example of 1st subset of simulations

Following distance less than threshold

METHOD AND SYSTEM FOR ASSESSING AND MITIGATING RISKS ENCOUNTERABLE BY AN AUTONOMOUS VEHICLE

CROSS-REFERENCE TO RELATED APPLICATIONS

This application claims the benefit of U.S. Provisional Application No. 63/432,137, filed 13 Dec. 2022, and U.S. Provisional Application No. 63/442,636, filed 1 Feb. 2023, each of which is incorporated in its entirety by this reference.

TECHNICAL FIELD

This invention relates generally to the autonomy, transportation, and vehicle fields, and more specifically to a new and useful system and method for assessing and mitigating risks encounterable by an autonomous vehicle in the autonomy, transportation, and vehicle fields.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
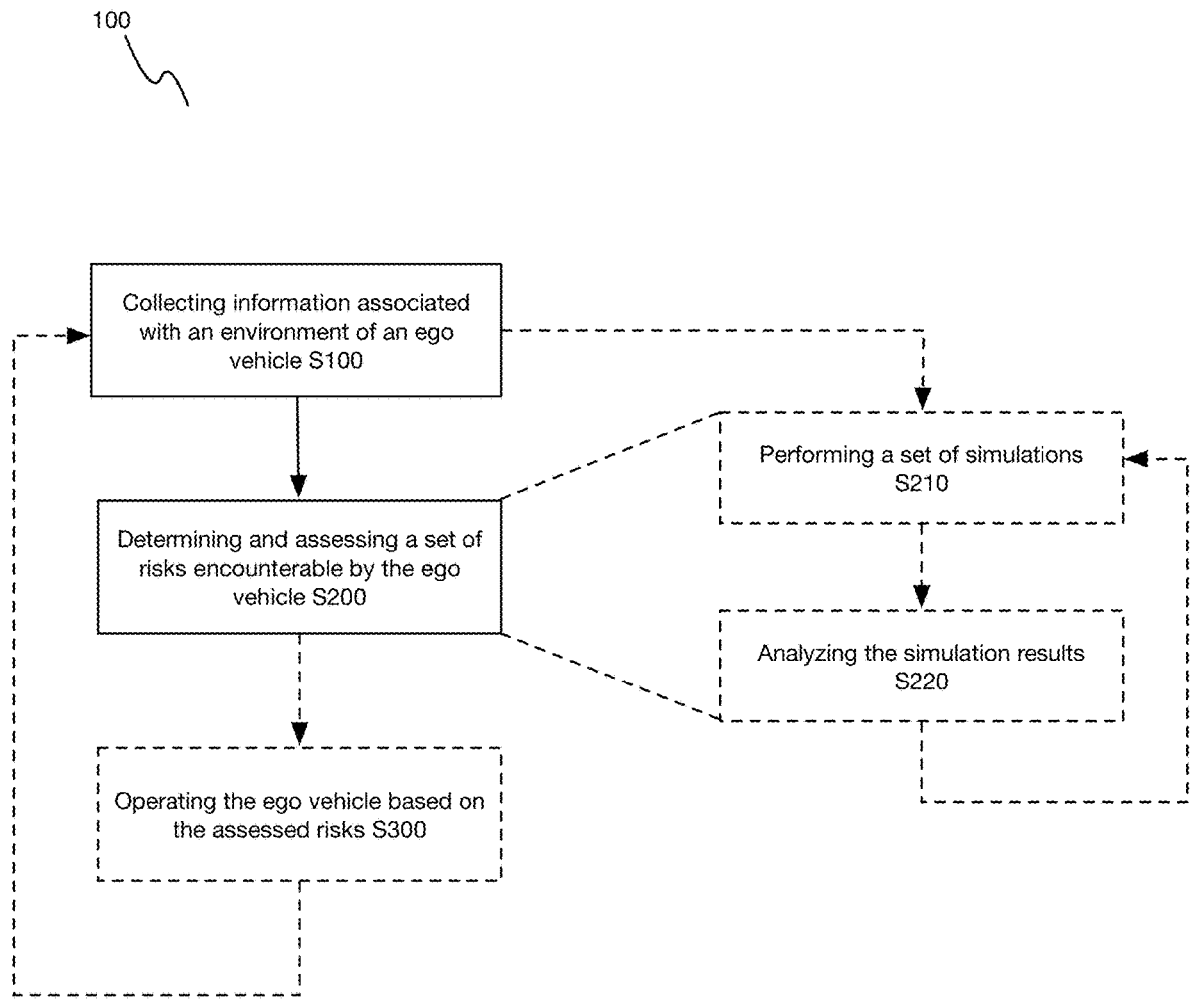
FIG. 1 is a schematic of a method for assessing and mitigating risks encounterable by a vehicle.

As shown in FIG. 1, a method 100 for assessing and mitigating risks encounterable by an autonomous vehicle includes collecting information associated with an environment of an ego vehicle S100 and determining and assessing a set of risks encounterable by the ego vehicle S200. Additionally or alternatively, the method 200 can include any or all of: operating the ego vehicle based on the assessed risks S300, performing a set of simulations S210, analyzing the simulation results S220, and/or any other processes. Further additionally or alternatively, the method 100 can include and/or interface with any or all of the processes as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/072,939, filed 1 Dec. 2022; and U.S. application Ser. No. 18/109,689, filed 14 Feb. 2023; each of which is incorporated herein in its entirety by this reference, or any other suitable processes performed in any suitable order.

The method 100 can be performed with a system 200 as described below and/or any other suitable system.

Figure 2:
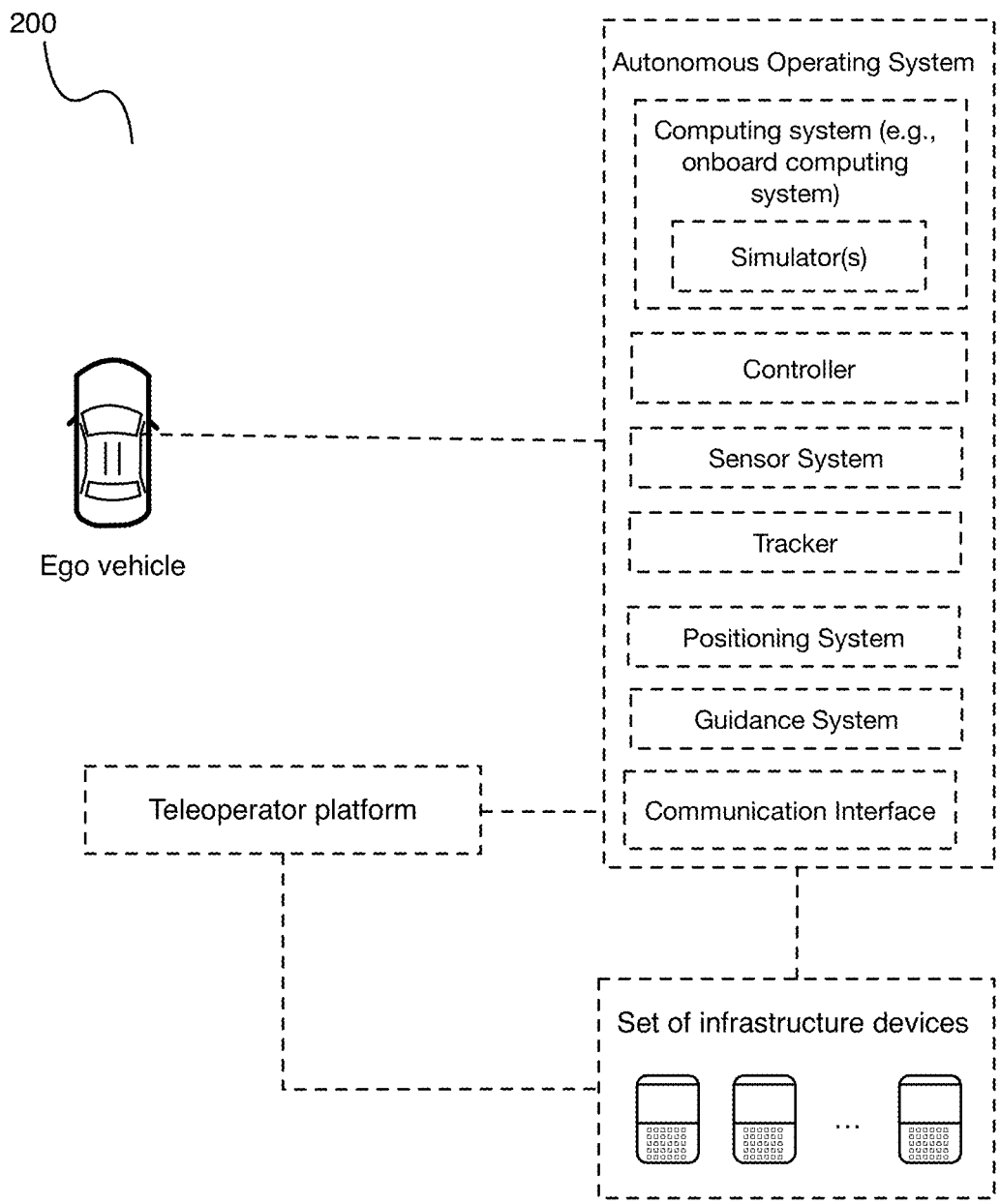
FIG. 2 is a schematic of a system for assessing and mitigating risks encounterable by a vehicle.

As shown in FIG. 2, a system 200 for assessing and mitigating risks can include and/or interface with an ego vehicle (equivalently referred to herein as an autonomous vehicle, autonomous agent, ego agent, agent, etc.) and a set of computing subsystems (equivalently referred to herein as a set of computers) and/or processing subsystems (equivalently referred to herein as a set of processors), which function to implement any or all of the processes of the method 100. Additionally or alternatively, the system 200 can include and/or interface with one or more sets of sensors (e.g., onboard the ego agent, onboard a set of infrastructure devices, etc.), a simulation subsystem including a set of simulators (e.g., executable at one or more computing subsystems), a set of infrastructure devices, a teleoperator platform, a tracker, a positioning system, a guidance system, a communication interface, and/or any other components.

Additionally or alternatively, the system can include any or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/072,939, filed 1 Dec. 2022; and U.S. application Ser. No. 18/109,689, filed 14 Feb. 2023; each of which is incorporated herein in its entirety by this reference.

2. Benefits

The system and method for assessing and mitigating risks encounterable by an autonomous vehicle can confer several benefits over current systems and methods.

In a first variation, the technology confers the benefit of enabling an autonomous vehicle to operate (e.g., drive) in ways which are similar to those in which human drivers operate manually driven vehicles. In examples, for instance, the technology enables autonomous vehicles to assess and triage risks, allowing the vehicle to effectively gain more time (and optionally adjust its behavior to gain this time) before making a decision for risks which do not present immediate harm and/or might not present harm in the future (e.g., as neighboring vehicles change their behavior). This can be analogous, for instance, to the ways in which humans change their behaviors (e.g., take foot off the gas pedal if there is uncertainty on if another vehicle is going to turn in front of them, start braking if there is a potential risk up ahead, etc.) and/or otherwise not pre-emptively execute a sudden or overly conservative response for risks that might not actually present.

Figure 4:
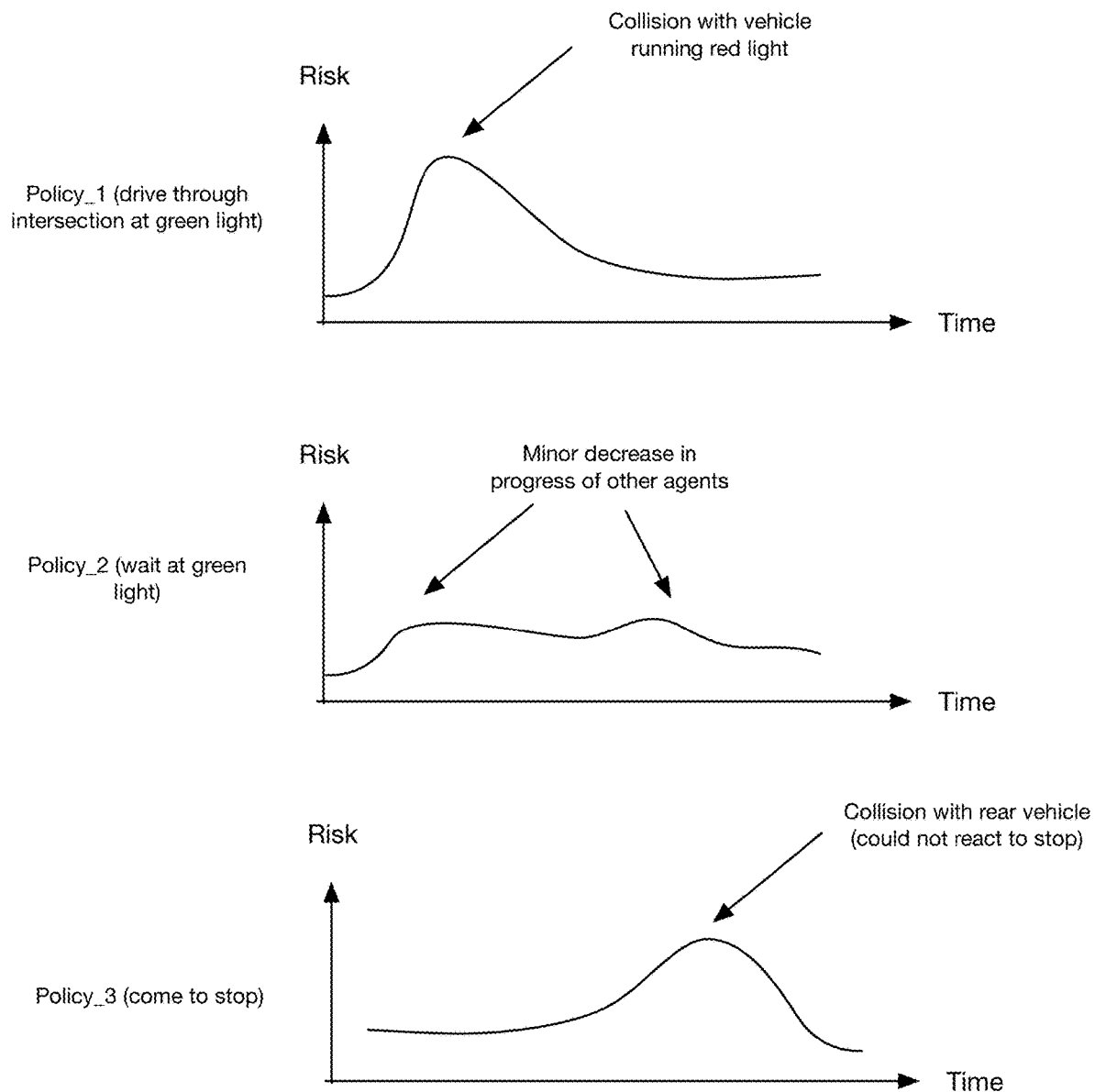
FIG. 4 is a demonstrative example of a set of risk profiles produced and assessed during a method for assessing and mitigating risks encounterable by a vehicle.

In a set of examples, temporal risk profiles (e.g., as shown in FIG. 4) are produced which quantify a level of risk and when that anticipated risk is predicted to occur, which can enable the autonomous vehicle to tolerate risks that are far enough in the future (e.g., past a predetermined threshold of seconds, past a predetermined reaction time, with enough time for the ego agent or other agents to safely and/or smoothly brake, etc.) without exhibiting overly cautious or unnecessarily conservative behavior, such as coming to a stop (e.g., braking for a vehicle that does not actually end up turning in front the ego agent).

In a second variation, additional or alternative to the first, the technology confers the benefit of overcoming any or all of the limitations experienced when using conventional cost and/or loss functions for autonomous vehicle decision-making. In some examples of conventional cost functions, for instance, the cost function calculations involve aggregating numerous different factors, often with different units, in a weighted fashion, where the relative weights are determined (e.g., tuned, hyper-tuned, etc.) for specific scenarios, leading to unwanted tradeoffs in other scenarios and the potential for unexpected behaviors of the vehicle. In examples of the system and method, any or all calculations used for decision making of the vehicle are performed using factors which are measurable and meaningful (e.g., produced in accordance with physics principles), as well as of the same unit type, thereby producing robust analyses that do not require special use cases to be handled differently.

In a third variation, additional or alternative to those described above, the technology confers the benefit of utilizing forward simulations (aka simulations simulating forward steps in time) to accurately account for the risks associated with future scenarios (equivalently referred to herein as futures) which may be encountered by the autonomous vehicle. In examples, system and/or method maximize a value and effectiveness of simulations and simulation types to accurately determine which risks the vehicle needs to respond to immediately and which can be further analyzed with more time.

In a fourth variation, additional or alternative to those described above, the technology confers the benefit of leveraging multiple types of simulations, the types of simulations differing in how the vehicle's environment is presented (e.g., what objects the environment contains), where the difference in simulation types enable a set of relative metrics to be determined, which can be used to assess any or all of: which risks to prioritize, which risks to consider, what the ego vehicle's contribution to the risk is, what other agents' contribution to the risk is, and/or any other information.

In a fifth variation, additional or alternative to those described above, the technology confers the benefit of enabling a spectrum and/or multitude of risk types and risk severities to be considered and assessed, rather than using only the most severe risks (e.g., collisions) in the vehicle's decision making, which can conventionally lead to ego vehicles exhibiting overly conservative, unpredictive, progress-hindering behaviors. In variants, the method involves considering multiple types of risks, such as, but not limited to: collisions, conflict zones (e.g., the potential for the ego vehicle to be in a risk-heavy region with another agent, the potential for the ego vehicle to cross paths with another object, etc.), reduced following distances, and/or any other risks.

In a sixth variation, additional or alternative to those described above, the technology confers the benefit of predicting risk (e.g., a risk mitigation factor) that not only reflects the ego vehicle's future risk, but also (or alternatively) risk relating to objects in the ego's environment and their abilities to (1) mitigate risk from their perspective (e.g., braking to avoid the ego vehicle, braking to avoid another object, etc.) and (2) mitigate risk caused by environmental objects interacting with each other (e.g., when the ego is not involved at all). In examples, this is enabled though any or all of: the different types of simulations (e.g., simulations where ego is absent), the analysis of the likelihood of different predicted scenarios, the incorporation of prediction uncertainties in simulations when calculating risk metrics, and/or any other features of the system and/or method.

Additionally or alternatively, the system and method can confer any other benefit.

3. Method 100

As shown in FIG. 1, a method 100 for assessing and mitigating risks encounterable by an autonomous vehicle includes collecting information associated with an environment of an ego vehicle S100 and determining and assessing a set of risks encounterable (e.g., potentially encountered in the future) by the ego vehicle S200. Additionally or alternatively, the method 200 can include any or all of: operating the ego vehicle based on the assessed risks S300, performing a set of simulations S210, analyzing the simulation results S220, and/or any other processes. Further additionally or alternatively, the method 100 can include and/or interface with any or all of the processes as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/072,939, filed 1 Dec. 2022; and U.S. application Ser. No. 18/109,689, filed 14 Feb. 2023; each of which is incorporated herein in its entirety by this reference, or any other suitable processes performed in any suitable order.

The method 100 can be performed with a system 200 as described below and/or any other suitable system.

The method 100 preferably functions to accurately assess and optimally respond to potential risks that the ego vehicle may encounter in the future. In preferred implementations, for instance, the method 100 enables the vehicle to accurately account for the risk of a potential future situation without responding in ways which are either too conservative (e.g., due to overestimating the risk and/or its likelihood) or too aggressive (e.g., due to underestimating the risk and/or its likelihood). In specific examples, for instance, the method 100 functions to handle uncertainty related to what the future will actually look like (e.g., if a pedestrian will cross the road or not, if another vehicle will drive without stopping through a stop sign, if another vehicle will merge ahead of the ego vehicle, etc.), where handling the uncertainty can include allowing time to pass (and/or certain behaviors to be implemented) to collect more information about the environment and which scenarios will come to fruition, thereby enabling a response of the vehicle to risks that do not present an immediate danger to the ego vehicle (or other vehicles/objects) to be delayed and/or mitigated. This can, in turn, prevent the vehicle from executing overly conservative behaviors (e.g., coming to an immediate stop, pulling over, etc.) when not necessary, executing overly aggressive behaviors (e.g., speeding up) when not safe, and/or otherwise not acting in a most intelligent manner based on its current understanding of its environment and the likelihood of identified risks from becoming real hazards. This can be in contrast to conventional approaches in which the vehicle finds the worst possible event that could happen (e.g., now, in the future, etc.) and acts based on that, which lead to overly conservative and/or otherwise unexpected behaviors (e.g., relative to human driving behavior).

Additionally or alternatively, the method 100 can function to prevent the need for special use cases to be individually handled by the autonomous vehicle. Further additionally or alternatively, the method 100 can perform any other functions.

The risks (equivalently referred to herein as hazards and/or hazardous events) encounterable by an autonomous vehicle preferably refer to potentially hazardous scenarios which are detectable by the autonomous vehicle, such as potentially hazardous events (e.g., collisions, potential collisions, etc.) that are detected based on data collected at a perception subsystem of the vehicle and processed at prediction and/or planning subsystems.

The method 100 can optionally be configured to interface with a multi-policy decision-making process (e.g., multi-policy decision-making task block of a computer-readable medium) of the ego agent and any associated components (e.g., computers, processors, software modules, etc.), but can additionally or alternatively interface with any other decision-making processes. In a preferred set of variations, for instance, a multi-policy decision-making module of a computing subsystem (e.g., onboard computing system) includes a simulator module (or similar machine or system) (e.g., simulator task block of a computer-readable medium) that functions to predict (e.g., estimate) the effects of future (i.e., steps forward in time) behavioral policies (operations or actions) implemented at the ego agent and optionally those at each of the set environmental agents (e.g., other vehicles in an environment of the ego agent) and/or objects (e.g., pedestrians) identified in an operating environment of the ego agent. The simulations can be based on a current state of each agent (e.g., the current hypotheses) and/or historical actions or historical behaviors of each of the agents derived from the historical data buffer (preferably including data up to a present moment). The simulations can provide data relating to interactions (e.g., relative positions, relative velocities, relative accelerations, etc.) between projected behavioral policies of each environmental agent and the one or more potential behavioral policies that may be executed by the autonomous agent. The data from the simulations can be used to determine (e.g., calculate) any number of metrics, which can individually and/or collectively function to assess any or all of: the potential impact of the ego agent on any or all of the environmental agents when executing a certain policy, the risk of executing a certain policy (e.g., collision risk), the extent to which executing a certain policy progresses the ego agent toward a certain goal, and/or determining any other metrics involved in selecting a policy for the ego agent to implement.

The multi-policy decision-making process can additionally or alternatively include and/or interface with any other processes, such as, but not limited to, any or all of the processes described in: U.S. application Ser. No. 16/514,624, filed 17 Jul. 2019; and U.S. application Ser. No. 17/365,538, filed 1 Jul. 2021; each of which is incorporated in its entirety by this reference, or any other suitable processes performed in any suitable order.

In a preferred set of variants, for instance, the method 100 is performed for each of a set of policies under consideration by the autonomous vehicle, where a risk metric and/or risk profile is generated for each policy (e.g., as shown in FIG. 4), where a particular policy is selected based on the metric(s) and/or profile(s). Selecting this policy, for instance, can be based on any or all of: a time in the future at which a maximum risk is predicted to occur (e.g., how far in the future) in the policy, a total level of risk associated with the policy (e.g., integrating over a risk curve), a magnitude of the risk (e.g., magnitude of maximum point in risk profile), an average risk, a median risk, and/or any other metrics. In some examples, for instance, a policy is selected based on both the value of the risk magnitude and the time in the future at which the risk is predicted to occur. In a specific example, for instance, a policy might be selected which has a higher overall risk relative to another policy option, but that risk is farther in the future (e.g., and later than a predetermined reaction time, and within a range of braking limits of the ego vehicle, etc.). Additionally or alternatively, any other features can be considered and evaluated (e.g., by comparison with one or more thresholds, through combination in a weighted fashion, through evaluation of an algorithm and/or model, etc.).

Additionally or alternatively, the risk metric(s) can dynamically inform which policy options are considered in future election cycles, such as at a next point in time. In examples, for instance, in an event that a risk is predicted for the vehicle far out in the future (e.g., more than 4 seconds in the future, more than 5 seconds in the future, more than 6 seconds in the future, more than 7 seconds in the future, more than a predetermined threshold of seconds in the future, where the ego vehicle or other objects could stop within a braking magnitude below a predetermined braking threshold, etc.), a policy of "slowing down" or "waiting" or "increasing a following distance relative to the vehicle in front" can be incorporated into the next set of policy operations for consideration, which can function to decrease this detected risk and/or push the risk further into the future.

In some examples, for instance, at least a portion of the types of the policies considered in a next election cycle are determined based on the risk profiles produced in the current election cycle.

Additionally or alternatively, the risk metric(s) can inform parameters involved in trajectory generation (e.g., speeds, locations, etc.) for the ego vehicle (e.g., as part of a path planning process), such as the trajectory produced in accordance with a policy or a trajectory produced in absence of a policy.

Additionally or alternatively, the method 100 can include and/or interface with any other decision-making processes.

3.1 Method—Collecting Information Associated with an Environment of an Ego Vehicle S100

The method 100 can include collecting information associated with an environment of an ego vehicle S100, which functions to receive information with which to assess the ego vehicle's environment and inform the performance of any or all of the remaining processes of the method 100.

S100 is preferably performed continuously (e.g., at a predetermined frequency, at irregular intervals, etc.) throughout operation of the ego agent, but can additionally or alternatively be performed: according to (e.g., at each initiation of, during each of, etc.) a cycle associated with the ego agent, such as any or all of: an election cycle (e.g., 10 Hz cycle, between 5-20 Hz cycle, etc.) associated with the ego agent (e.g., in which the ego agent selects a new policy), a perception cycle associated with the ego agent, a planner cycle (e.g., 30 Hz, between 20-40 Hz, occurring more frequently than the election cycle, etc.) associated with the ego agent; in response to a trigger (e.g., a request, an initiation of a new cycle, etc.); and/or at any other times during the method 100.

The inputs preferably include sensor inputs received from a sensor suite (e.g., cameras, Lidars, Radars, motion sensors [e.g., accelerometers, gyroscopes, etc.], outputs of an OBD-port, etc.], location sensors [e.g., GPS sensor], etc.) onboard the ego agent, but can additionally or alternatively include historical information associated with the ego agent (e.g., historical state estimates of the ego agent) and/or environmental agents (e.g., historical state estimates for the environmental agents), sensor inputs from sensor systems off-board the ego agent (e.g., onboard other ego agents or environmental agents, onboard a set of infrastructure devices and/or roadside units, etc.), information and/or any other inputs.

The inputs preferably include information which characterizes the environment of the ego agent, which can include: other objects (e.g., vehicles [equivalently referred to herein as environmental agents], pedestrians, stationary objects, etc.) proximal to the ego agent (e.g., within field-of-view of its sensors, within a predetermined distance, etc.), equivalently referred to herein as environmental agents; environmental features of the ego agent's surroundings (e.g., to be referenced in a map, to locate the ego agent, etc.); and/or any other information. In some variations, for instance, the set of inputs includes information (e.g., from sensors onboard the ego agent, from sensors in an environment of the ego agent, from sensors onboard the objects, etc.) that characterizes any or all of: the location, type/class (e.g., vehicle vs. pedestrian, etc.), and/or motion of environmental objects being tracked by the system 200, where environmental objects can include static objects (e.g., parked or otherwise non-moving vehicles, stationary pedestrians, etc.), dynamic objects (e.g., moving vehicles, walking or running pedestrians, bikers, etc.), or any other objects or combinations of objects. Additionally or alternatively, the set of inputs can include information that characterizes (e.g., locates, identifies, etc.) features of the road and/or other landmarks/infrastructure (e.g., where lane lines are, where the edges of the road are, where traffic signals are and which type they are, where agents are relative to these landmarks, etc.), such that the ego agent can locate itself within its environment (e.g., in order to reference a map), and/or any other information.

The inputs further preferably include information associated with the ego agent, which herein refers to the vehicle being operated during the method 100. This can include information which characterizes the location of the ego agent (e.g., relative to the world, relative to one or more maps, relative to other objects, etc.), motion (e.g., speed, acceleration, etc.) of the ego agent, orientation of the ego agent (e.g., heading angle), a performance and/or health of the ego agent and any of its subsystems (e.g., health of sensors, health of computing system, etc.), and/or any other information.

Any or all of this information can additionally or alternatively be determined for environmental objects.

Additionally or alternatively, S100 can include any other processes and/or involve the collection of any other suitable information.

In a preferred set of variations, S100 includes collecting sensor data which is used to perform the simulations described in S210.

3.2 Method—Determining and Assessing a Set of Risks Encounterable by the Ego Vehicle S200

The method 100 includes determining and assessing a set of risks encounterable by the ego vehicle S200, which functions to perform any or all of: detecting the potential hazards that the ego vehicle may encounter in the future, determining whether or not (and/or when) these potential hazards pose a current or future risk, and determining whether or not the potential hazards could be avoided (e.g., by the ego vehicle, by other vehicles or entities in an environment of the ego vehicle, etc.). S200 further preferably functions to inform how to vehicle is operated in S300. Additionally or alternatively, S200 can perform any other suitable functions.

S200 is preferably performed in response to and based on the information received in S100, but can additionally or alternatively be performed at any other suitable times and/or based on any suitable information.

Figure 7:
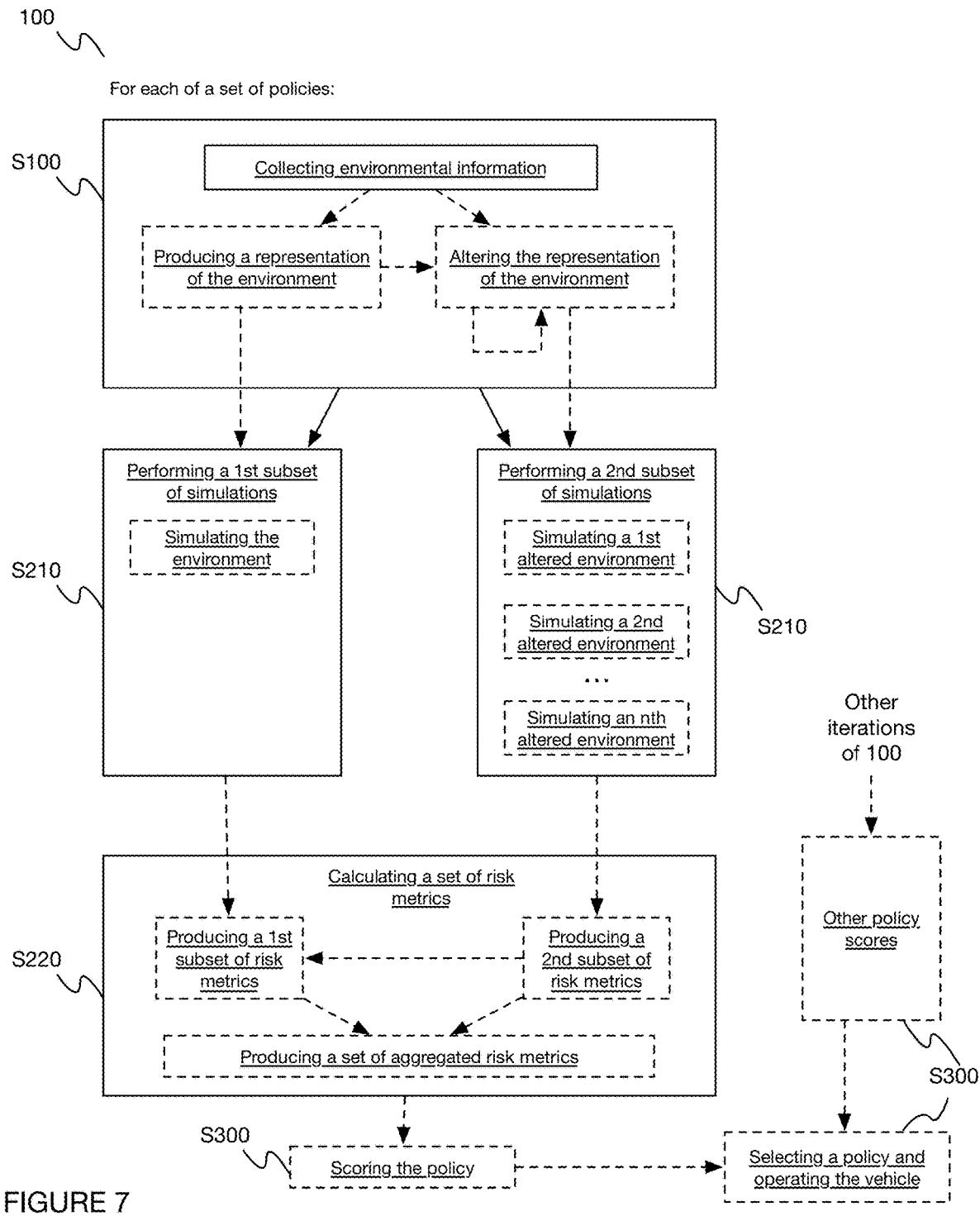
FIG. 7 depicts a variant of a method for assessing and mitigating risks encounterable by a vehicle.

S200 preferably includes performing a set of simulations S210 (e.g., as shown in FIG. 7), which functions to enable risks which could occur in the future to be detected and further characterized (e.g., in S220). The set of simulations preferably includes forward simulations, which examine future scenarios (based on forward stepping in time) for the ego vehicle and objects (e.g., other vehicles, pedestrians, etc.) in its environment, such as in an event that the ego vehicle (and/or other vehicles) performs a certain policy (e.g., behavior, action, etc.). Additionally or alternatively, the simulations can be otherwise suitably performed.

In a preferred set of variations, any or all simulations are performed within (e.g., during, as part of, etc.) a multi-policy decision-making process (e.g., as described above, as implemented during a planning cycle of the ego agent, etc.), such any or all of those described in U.S. application Ser. No. 16/514,624, filed 17 Jul. 2019, and/or U.S. application Ser. No. 17/365,538, filed 1 Jul. 2021, each of which is incorporated herein in its entirety by this reference. Alternatively, the simulations can be performed in accordance with a different decision-making process, performed absent of and/or asynchronously with a multi-policy decision-making process (e.g., during a trajectory generation and/or trajectory modification phase, during a path planning process, etc.), and/or at any other time(s).

In a set of examples, for instance, a set of simulations (e.g., including each simulation type) is performed for each potential policy that the ego vehicle considers executing (e.g., as its next policy).

The set of simulations preferably includes multiple types of simulations (e.g., as described below), wherein the multiple types of simulations function to collectively provide accurate, robust assessments of risks and/or features of the risks (e.g., likelihood, characterization, etc.) which may occur in the future. The multiple simulation types can be simulated: in parallel, in series, and/or any combination. Alternatively, simulations of a single type and/or any other types of simulations can be performed in S210.

3.21 $1^{st}$ Subset of Simulations

The set of simulations performed in the method 100 preferably includes a $1^{st}$ subset of simulations, wherein the $1^{st}$ subset of simulations functions to represent the ego agent's environment in the future. Additionally or alternatively, the $1^{st}$ subset of simulations can function to identify potential risks, identify objects associated with potential risks, utilize the potential risk and/or associated objects to inform future processing in the method 100, and/or perform any other functions.

Figure 3A:
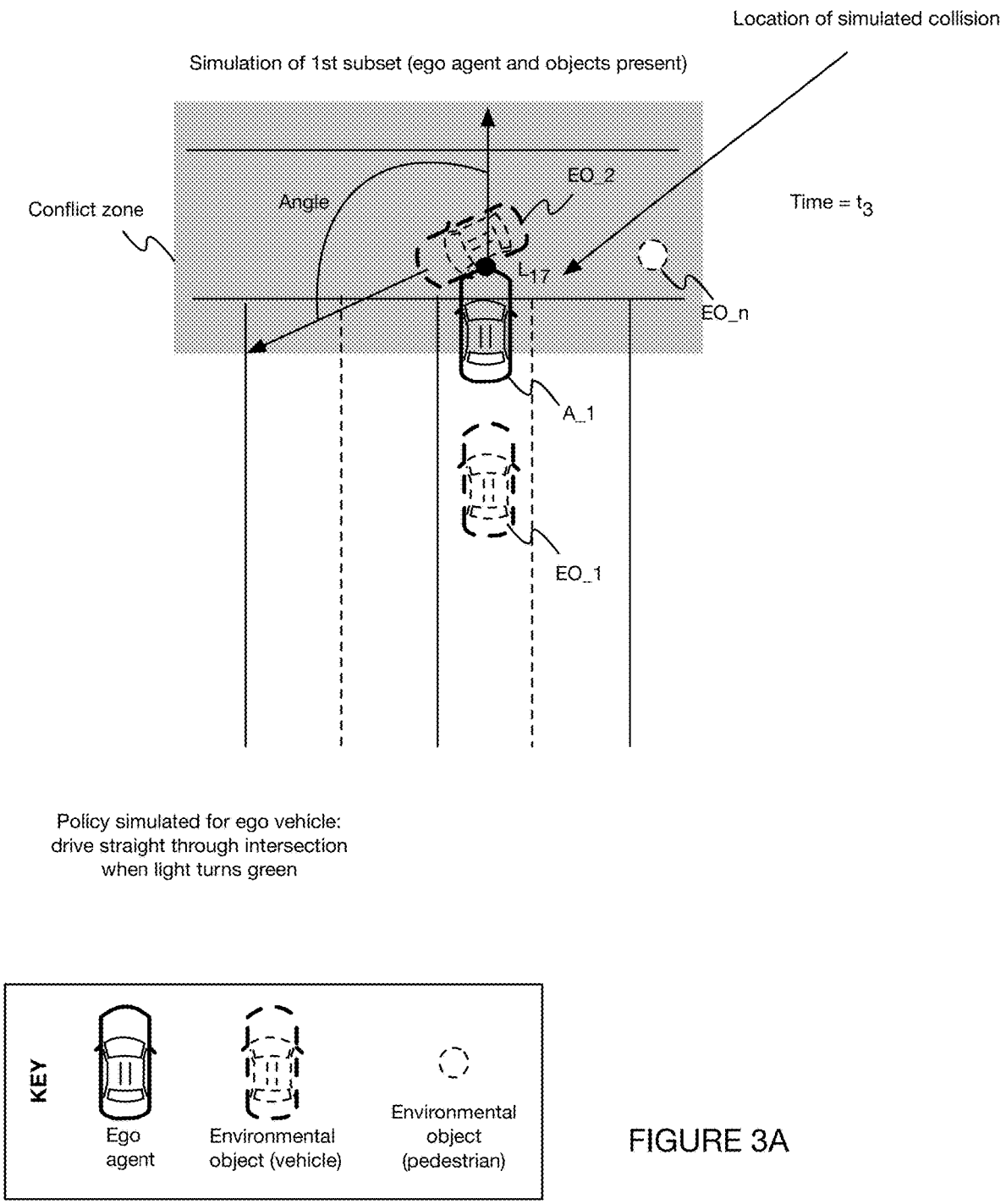
FIGS. 3A-3F depict an example of a method for assessing and mitigating risks encounterable by a vehicle.

The $1^{st}$ subset of simulations preferably includes a $1^{st}$ type of simulation, wherein in the $1^{st}$ type of simulation (e.g., as shown in FIG. 3A), the ego vehicle is simulated together with the environmental objects (e.g., other vehicles, pedestrians, other objects, etc.) in its environment, thereby representing the ego vehicle's actual, predicted environment. As such, the $1^{st}$ subset of simulations preferably functions to enable detection of potential hazardous events (aka risks)

which might result from interactions (e.g., collisions, near-misses of collisions, etc.) between the ego vehicle and objects in its environment. Additionally, the $1^{st}$ type of simulation can detect potential hazardous events that would result between other agents in the ego vehicle's environment in response to an action executed by the ego vehicle, such as a collision between two other agents. In an example for instance, in an event that the ego vehicle pulls in front of a $1^{st}$ environmental agent, the simulation might show that the $1^{st}$ environmental agent might brake quickly to avoid hitting the ego vehicle, and in doing so, cause a $2^{nd}$ environmental agent behind the $1^{st}$ environmental agent to collide with (e.g., rear end) the $1^{st}$ environmental agent.

As such, in the $1^{st}$ type of simulation, forward movement of the ego vehicle and environmental objects (e.g., as specified with an intent estimation process, based on proposed policies for the environmental objects, based on proposed paths for the environmental objects, based on current and/or historical detected positions and speeds of the environmental objects, etc.) is simulated and assessed to determine any or all of: if the ego vehicle collides with (e.g., overlaps with, contacts, etc.) any environmental objects, if another potentially hazardous or unwanted event occurs (e.g., the ego vehicle nearly collides with an environmental object, the ego vehicle causes an environmental object to collide with another environmental object, etc.), the metrics associated with such events (e.g., as described below), and/or if any other types of outcomes could potentially occur in future time.

The $1^{st}$ type of simulation preferably checks for (and enables the analysis of) multiple types and/or severities of risk. Alternatively, the $1^{st}$ type of simulation can check for a single type of risk, different simulation types can check for risk, and/or risk can be otherwise suitably analyzed by one or more simulation types.

The types of risk preferably include predicted collisions (e.g., ego vehicle being in the same location at the same time with another object, 2 objects being in the same location at the same time, etc.), which represent an actual chance of contact between objects, indicating a highest severity risk, for instance. Predicted collisions can further be analyzed (e.g., based on data from the $1^{st}$ collision type) to determine any or all of: whether or not the ego vehicle and/or other objects can prevent the collision (e.g., based on the time at which the collision is predicted to occur, based on a braking ability of the ego vehicle, based on predicted braking abilities of the other objects, based on a predicted reaction time and/or braking time of the ego or other objects, etc.); to what extent other objects are paying attention to the potential collision (e.g., based on historical data associated with the other objects, based on historical driving behaviors of the other objects, based on estimated intents of the other objects, etc.); a probability that the collision would happen (e.g., based on uncertainties associated with the positions and/or speeds of the simulated objects); and/or any other features.

Figure 5:
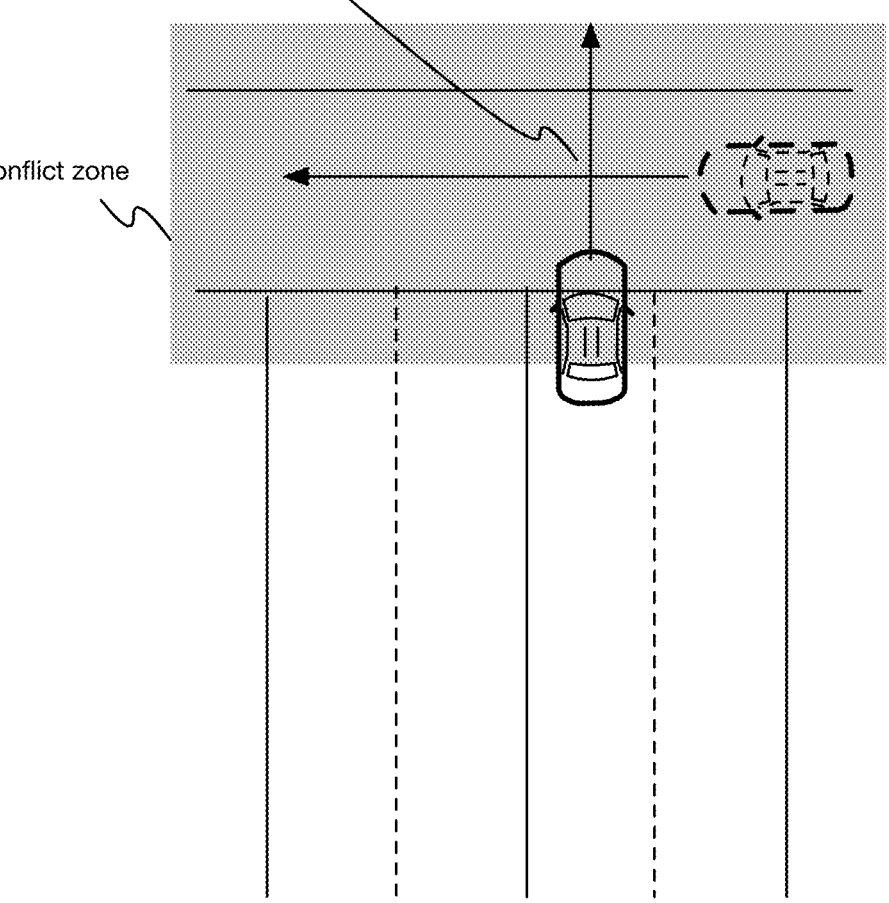
FIG. 5 depicts an example of a future point in time simulated in the 1st subset of simulations.

The types of risk further preferably include the ego vehicle being proximal to (e.g., within a predetermined distance from, being shown to enter a conflict zone within the forward simulation, etc.) and/or approaching and/or entering a conflict zone, where a conflict zone represents a region that has the potential to result in conflict. Conflict can reflect any number of potential scenarios or be associated with any number of features, such as, but not limited to, regions with a high likelihood of any or all of: near-miss collisions, collisions of a particular type, a distance between objects that is below a predetermined threshold, a failure of the ego vehicle or other object to maintain a minimal clearing distance relative to other objects, particular angle ranges between headings of the ego vehicle and/or other objects, a crossing of paths between objects (e.g., ego vehicle and another vehicle, as shown in FIG. 5, etc.), and/or any other events.

The conflict zones can be any or all of: predetermined (e.g., defined in/retrieved from a map), dynamically determined (e.g., based on predicted behaviors/paths of the ego vehicle and/or other objects in the simulation), or any combination of predetermined and dynamically determined.

In some variants, for instance, the conflict zones are at least partially predetermined (e.g., encoded in a map) and include regions where there is the possibility that the ego vehicle would cross paths with and/or approach the same location as another object. The conflict zones can optionally further include: regions in which the ego vehicle could be traveling with a heading that is different than a heading of another object (e.g., 90-degree angle difference, between 0 and 360 degrees, between 90 and 360 degrees, etc.), regions including pedestrians or the potential for pedestrians, and/or any other regions.

In a particular set of examples, a conflict zone in the form of a crosswalk can function to create a model that encodes the risk associated with the ego's interaction(s) with Vulnerable Road Users (VRUs) (e.g., pedestrians) on crosswalks. For instance, such a conflict zone and its associated way of handing can provide a concrete implementation of how associated risks should be handled safely and effectively. Depending on the positions and velocities of the ego and the object(s), it can create a risk profile that discourages the ego vehicle from entering the conflict zone when a pedestrian is in the conflict zone. The generated risk profile enables (e.g., in S300) the ego vehicle to maintain a safe distance away from other agents by penalizing proximity to the conflict zone (e.g. if another object is predicted in the $1^{st}$ subset of simulations to be in the conflict zone with the ego vehicle). The result is a set of risk metrics associated with each interacting VRU, where for instance, the most constraining agent can be the one with the highest risk (e.g., scaled based on probability of interaction and severity). Computing the probability of interaction can be based on any or all of: where the VRU would be located on the crosswalk, how far the ego vehicle would be from the crosswalk, how fast the ego vehicle would be approaching the crosswalk, and/or any other features. The severity can be determined based on the distance of the ego vehicle from the conflict zone, the speed of the objects, the headings of the objects, and/or any other features, Conflict zones can optionally be dynamically adjusted (e.g., considered, removed from consideration) based on the results of the $1^{st}$ subset of simulations, such as based on whether or not any other object could be located in a conflict zone at the same time as the ego vehicle, based on whether or not another object could be within a predetermined distance of the ego vehicle within a conflict zone, and/or based on any other information.

In some variants, for instance, checking for conflict zones includes checking to see if the ego vehicle is approaching and/or within an intersection (e.g., as shown in FIG. 3A, within the forward simulation time, at a time in which another object is predicted to be in the conflict zone, etc.), Additionally or alternatively, checking for conflict zones can include: checking to see the predicted time gap between when the ego vehicle is in a conflict zone and/or at a particular location relative to when another object will be in that zone and/or at that location (e.g., to serve as a proxy for how much that object would have to brake to avoid the ego vehicle, to serve as an indicator for whether or not the object could avoid hitting the ego vehicle, etc.); checking to see if the ego vehicle (or other object) is going to be in another object's lane during a lane change or lane cross maneuver; checking to see if the ego vehicle is approaching a crosswalk or other area with pedestrians; checking to see if the ego vehicle is going to cross and/or enter a bike lane; and/or any other scenarios can be checked for.

Figure 6:
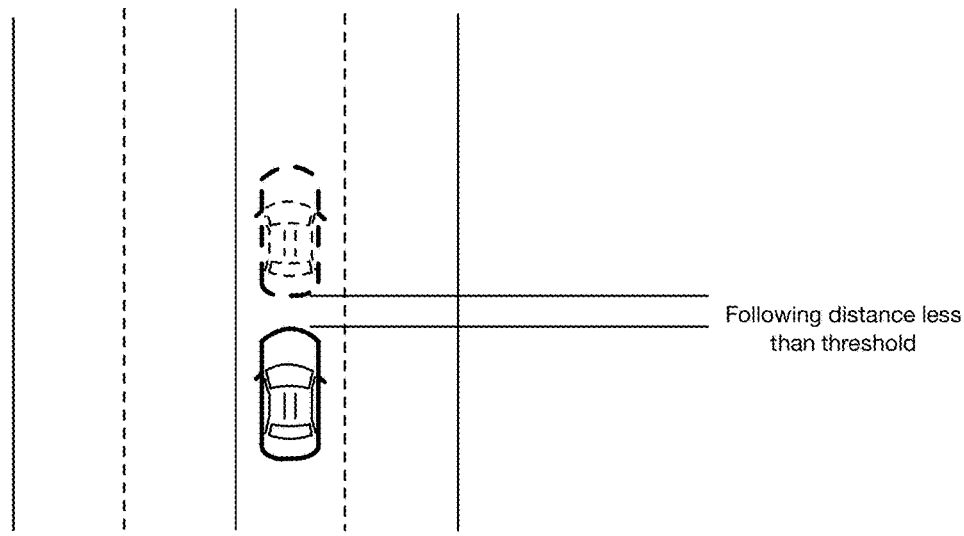
FIG. 6 depicts an example of a future point in time simulated in the 1st subset of simulations.
Figure 6:
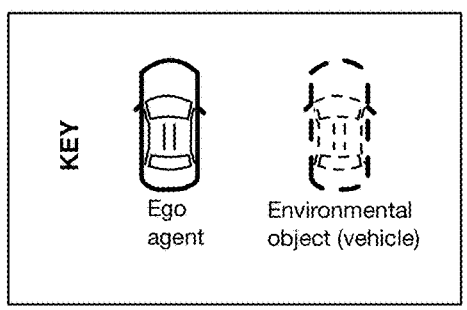

The types of risks further preferably include an assessment of whether or not (and/or to what extent) the ego vehicle is predicted to maintain a predetermined clearance and/or following distance relative to other objects. For instance, when trailing another vehicle, the ego vehicle might have a goal of maintaining at least a predetermined gap (e.g., 2-second gap, between 2-4 seconds, at least 1 second, assured clearance distance ahead, etc.) relative to the leading vehicle. Further, when passing an object, a certain clearance (e.g., distance) or minimum clearance might be desired to be maintained (e.g., to prevent a car door from opening into the ego vehicle, to prevent the ego vehicle from blocking and/or side-swiping a cyclist, etc.). Upon determining, for instance, that the ego vehicle might not achieve these clearances in the $1^{st}$ type of simulation (e.g., as shown in FIG. 6), this risk can be assessed and used, as this reflects that if something unexpected were to happen (e.g., a scenario not reflected in the simulation), the ego vehicle (or other objects) might not be able to react in time.

In variants, for instance, any or all of the risk metric(s) calculated below can reflect that the overall risk for the ego vehicle increases as the gap (e.g., temporal gap, distance gap, etc.) between itself and other objects decreases. This might encourage, for instance (e.g., after taking into account other risks/factors in the calculation), that the ego vehicle selects a policy of slowing down to increase this gap.

As described below, the method 100 can further include quantifying, scaling, discounting and/or removing from further consideration, aggregating, and/or otherwise processing these risks.

Additionally or alternatively, any other risk types can be checked for, evaluated, and/or used in calculating risk metrics (e.g., as described below).

Any or all of the above risks can optionally additionally be computed relative to non-ego-vehicle interactions, such as between environmental objects.

The presence or absence of these risks preferably functions to identify which objects are involved in risk, and therefore which calculations should be made in calculating risk (e.g., as described below), but can additionally or alternatively perform any other functions.

For instance, the $1^{st}$ subset of simulations ultimately enables any or all of the following to be determined: which objects contribute risk to the environment, which of these risks can be mitigated (e.g., by slowing down, by speeding up, by changing lanes, etc.), how is the risk evolving (e.g., increasing, decreasing, staying the same, etc.) over time, and/or any other features of the risk.

Additionally or alternatively, the $1^{st}$ subset of simulations can include any other simulation types and/or be otherwise suitably performed.

3.22 $2^{nd}$ Subset of Simulations

The set of simulations performed in the method 100 preferably includes a $2^{nd}$ subset of simulations, wherein the $2^{nd}$ subset of simulations functions to represent one or more altered versions of the ego vehicle's environment in the future. The $2^{nd}$ subset of simulations further preferably functions to identify which data to retrieve for comparison from the $1^{st}$ subset of simulations. Additionally or alternatively, the $2^{nd}$ subset of simulations can function to: determine which object a risk can be attributed to; determine an uncertainty associated with scenarios in the $1^{st}$ subset of simulations; determine the magnitude of worst-case scenarios; and/or perform any other functions.

The $2^{nd}$ subset of simulations preferably includes multiple simulation types, wherein the simulation types can differ in how the environment is altered. The environment is preferably altered by selectively include certain objects, but can additionally or alternatively be otherwise altered (e.g., objects having altered speeds, objects having altered locations, etc.). In preferred variants, for instance, the $2^{nd}$ subset of simulations includes a $1^{st}$ type of simulation in which the ego vehicle is removed from the environmental representation, and a $2^{nd}$ type of simulation in which all non-ego objects are removed from the environmental representation. Additionally or alternatively, the $2^{nd}$ subset of simulations can include any other simulations.

Figure 3B:
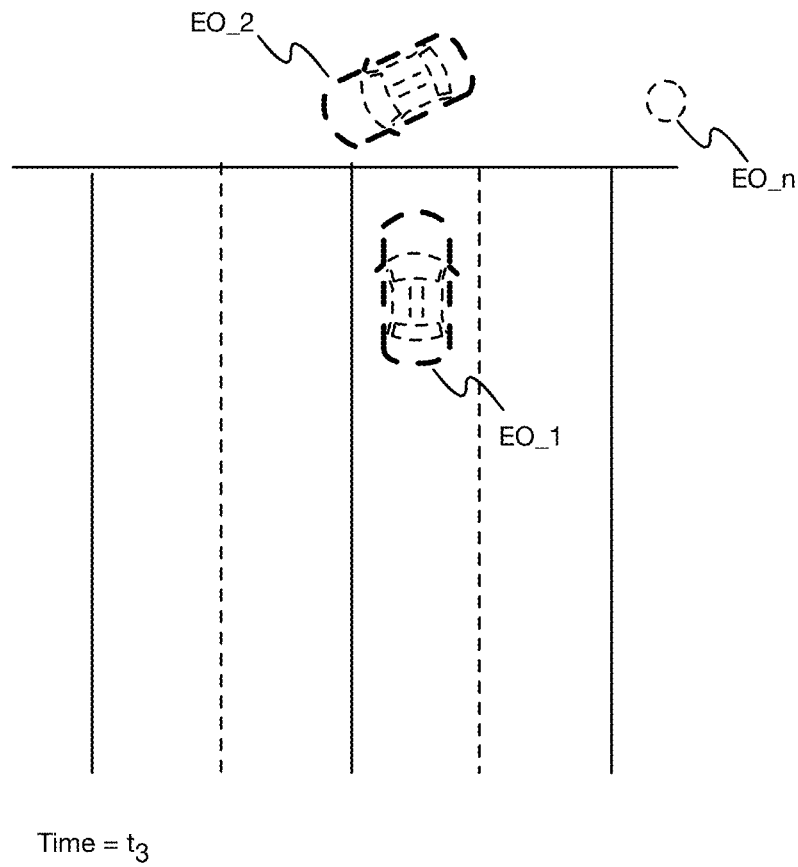
Figure 3B:
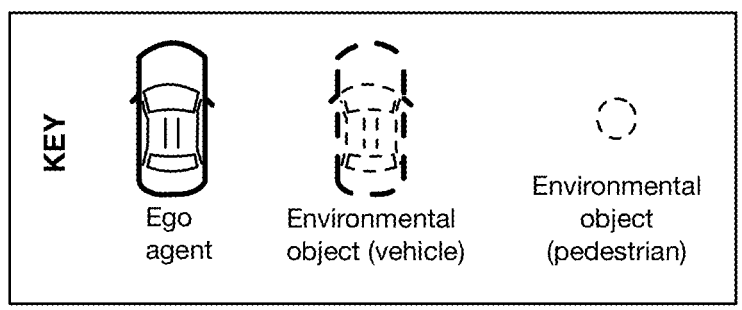

For instance, in the $1^{st}$ type of the $2^{nd}$ subset of simulations (e.g., as shown in FIG. 3B), the ego vehicle is not present—only the positions, movements, and behaviors of the environmental objects are simulated. This alteration of the preferably functions to enable a relative effect (e.g., impact) of the ego vehicle's movement/actions/behavior on the environmental objects to be determined and quantified in the risk metric(s) (e.g., as described below). In some variations, for instance, the $2^{nd}$ subset of simulations enables further insights into whether or not (and/or to what extent) a potentially hazardous event detected in the $1^{st}$ subset of simulations is caused by the presence and/or actions of the ego vehicle. This can, in turn, inform to what extent the risk can be mitigated by the ego vehicle and/or which policies are most suitable for the ego vehicle to implement (e.g., in S300). Additionally, this simulation type can function to determine the amount of energy and/or work required by the other agents to mitigate risk caused by the ego vehicle's actions (e.g., brake quickly to avoid a collision with the ego vehicle or other agent, swerve onto a shoulder of the road, etc.).

Figure 3C:
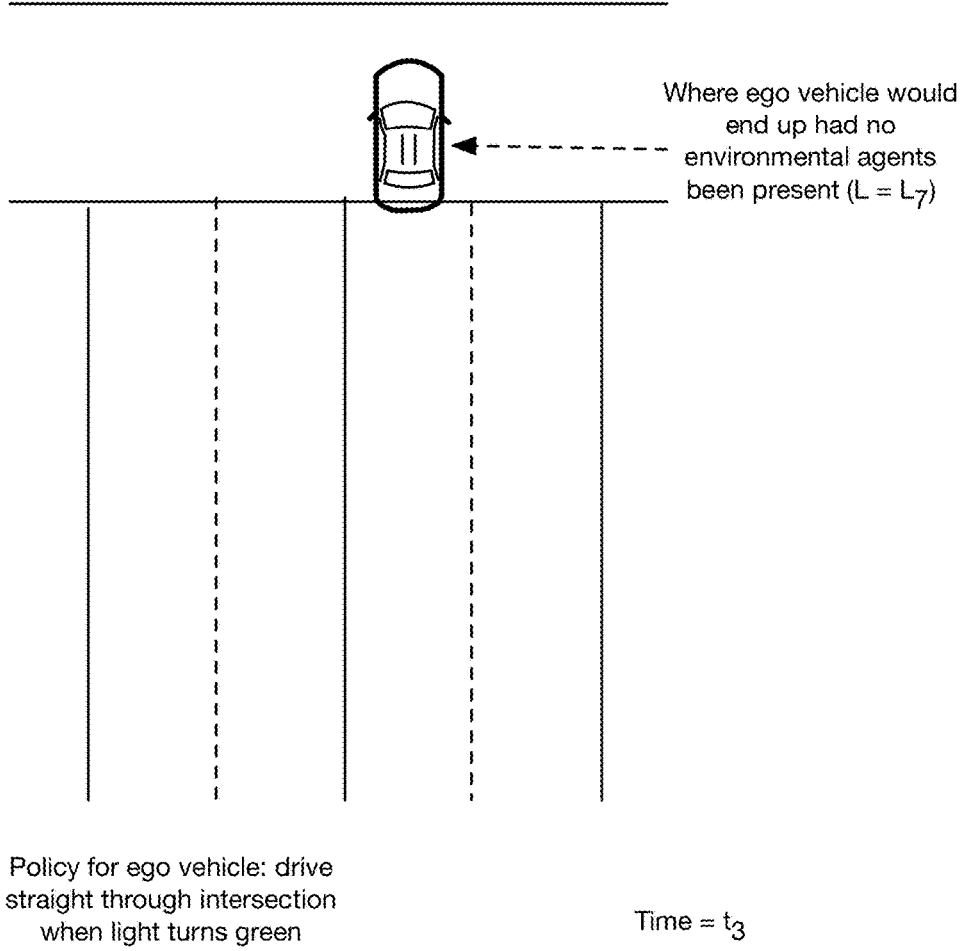
Figure 3C:
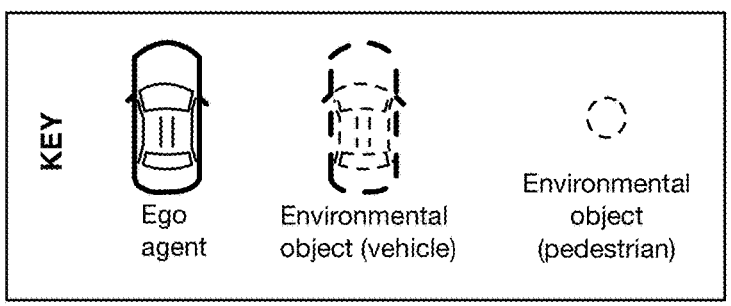

The set of simulations can optionally additionally or alternatively include a $2^{nd}$ type of the $2^{nd}$ subset of simulations (e.g., as shown in FIG. 3C), where in this simulation, only the ego vehicle is present—the environmental objects are not simulated. This simulation type preferably functions to provide information regarding the uncertainty naturally present in the forward simulations. For instance, by simulating only the ego vehicle, a worst case understanding of the uncertainty present in the ego vehicle's environment can be ascertained. In examples in which an increase in energy and/or work to the environment caused by the ego vehicle is determined, the $2^{nd}$ type of simulation of the $2^{nd}$ subset can function to provide the minimum amount of energy and/or work expenditure that the ego vehicle would experience if there were no other objects in its environment.

In examples, for instance, a "potential" energy metric is calculated later in the method 100, which functions to estimate the greatest energy that an action (policy) could introduce into the environment (e.g., worst case energy) when there is uncertainty of how an action executed by the ego vehicle will actually play out. For example, if the simulation shows that the vehicle would have to stop for an obstacle, but in practice when it executes the action, the vehicle does not stop because of an uncertainty (e.g., small error) in the prediction, the potential energy indicates that the vehicle might be moving at a high speed that is not accounted for in the simulation. Other types of uncertainty can include, for instance, uncertainties in the positions of any or all objects (e.g., based on imperfect sensors, based on limited fields-of-view of sensors, etc.), uncertainties in the motion of any or all objects (e.g., based on imperfect sensors, based on limited fields-of-view of sensors, etc.), uncertainties in the classification of objects (e.g., bicycle vs. car, car vs. truck, scooter vs. walker, etc.), uncertainties in the predicted future motion of other objects, and/or any other uncertainties.

These uncertainties can be particularly high, for instance, in crowded environments with multiple environmental agents.

Additionally or alternatively, the $1^{st}$ type of the $2^{nd}$ subset of simulations can function to take into account one or more uncertainties in the risk analysis.

Additionally or alternatively, the set of simulations can include any other simulations and/or types of simulations.

Figure 3D:
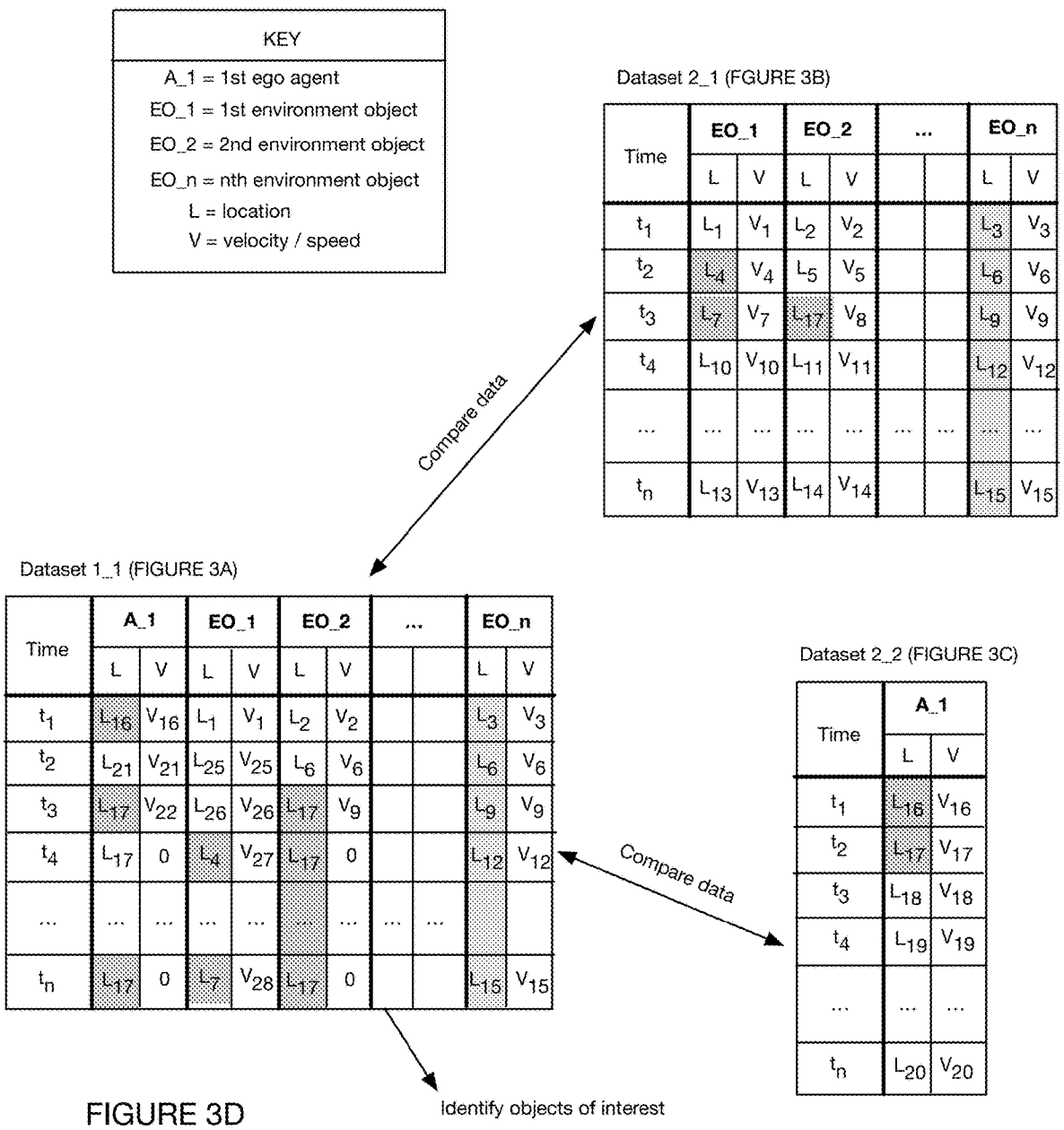

The $2^{nd}$ subset of simulations further preferably functions to determine which data to retrieve from the $1^{st}$ subset to enable relevant comparisons to be made with data from the $2^{nd}$ subset. For instance (e.g., as described below, as shown in FIG. 3D), the predicted locations of the ego vehicle and other objects from the $2^{nd}$ subset of simulations are used to find the same (or similar) locations in the $1^{st}$ subset, such that the velocities corresponding to the same locations can be retrieved from the different simulations and used in calculating risk (e.g., as described below). Additionally or alternatively, times can be referenced, and/or any other metrics retrieved and compared.

Additionally or alternatively, the $2^{nd}$ subset of simulations can include any other simulations and/or be otherwise suitably performed.

3.23 Method: Analyzing the Simulation Results S220

S200 further preferably includes analyzing the simulation results S220, which functions to detect, characterize, and/or quantify any or all of the risks encounterable by the vehicle and/or other agents in an environment of the vehicle (e.g., other vehicles, pedestrians, cyclists, etc.). The outputs of this analysis preferably include a set of risk metrics which can be used in decision-making (e.g., policy selection) of the ego vehicle (e.g., in S300), but can additionally or alternative be used to trigger further analyses (e.g., reward analyses) and/or otherwise be suitably used. In preferred variations, for instance, S220 functions to inform the operation of the vehicle in S300 (e.g., determine whether or not the vehicle needs to respond to the risk immediately, determine whether or not the risk can be avoided, etc.).

Analyzing the simulation results preferably includes determining if a potential risk (e.g., potential hazard event) is encounterable by the ego vehicle (and/or environmental objects) in the future. Potential risks are preferably identified based at least on the results of the $1^{st}$ subset of simulations, but can additionally or alternatively be identified based on other simulation types (e.g., $2^{nd}$ subset of simulations). S220 can further include characterizing a type of potential risk (e.g., collision, near-miss of a collision, collision involving a fatality vs. injury vs. property damage, property damage, violation of traffic rules, etc.) and/or an anticipated severity of the potential risk, which objects are involved in the potential risk, which objects contribute to the potential risk (e.g., are at-fault), and/or any other features.

Determining if a potential risk has been detected and/or characterizing the potential risk and/or its severity is preferably performed based on the calculation of a set of risk metrics. In a preferred set of variations, the risk is detected and/or characterized through the calculation of a set of energy metrics, which represent an effect (e.g., total amount of energy, total amount of modified energy, total amount of work done on the part of environmental objects, etc.) of the ego vehicle implementing a particular action (aka policy). This effect can indicate, for example, the amount of energy introduced to the environment from the ego vehicle performing a certain behavior and/or the amount of work that would be required by the ego vehicle and/or other objects to prevent a collision (or near collision) and/or respond to that behavior (e.g., slowing down to prevent a collision, stopping because a collision ahead has impeded its path, etc.). Additionally or alternatively, the effect can reflect any other scenarios and/or impact.

The risk metric is preferably determined based on one or more energy metrics, such as a kinetic energy and/or a modified (e.g., weighted, scaled, etc.) version of kinetic energy (e.g., derivative of velocity, velocity-squared, velocity-squared multiplied by a scaling factor, velocity-squared multiplied by mass and/or a scaling factor, kinetic energy without mass, etc.), where the energy metric represents—such as in the event of collision—the energy produced by the impact of the collision. Additionally or alternatively, any other energy metrics and/or work metrics and/or aggregated work and energy metrics can be calculated.

The energy metrics can reflect actual energy values (e.g., kinetic energy, potential energy, differences in energy, etc.), modified energy values (e.g., scaled kinetic energy, scaled potential energy, differences in modified energy, etc.), relative energy values, work and/or modified work metrics (e.g., work performed by the environmental agents in reacting to [e.g., slowing down, stopping, swerving, turning, etc.] the ego vehicle), relative work metrics, and/or any other metrics.

In preferred variants, for instance, the energy metrics include derivatives of simulated velocity values, and/or derivatives of simulated differences in velocity values (e.g., between simulation types). The derivatives are preferably $2^{nd}$ derivatives (e.g., velocity-squared, (difference in velocity)-squared, etc.), but can additionally be $1^{st}$ derivatives of velocity, derivatives greater than $2^{nd}$ derivatives, derivatives of position, and/or any other parameters.

One or more energy values is preferably calculated for each of the types of risk (e.g., collisions, conflict zones, clearance, etc.) that apply in the $1^{st}$ subset of simulations. The calculations of energy metrics preferably differ among at least a portion of the risk types, but can alternatively be uniformly calculated.

In an event of a collision risk type detecting a collision in the $1^{st}$ subset of simulations, the energy metric preferably reflects the energy (e.g., kinetic energy, scaled kinetic energy, etc.) of the collision. This energy metric is preferably determined based on aggregating (e.g., adding, multiplying, etc.) the velocity-squared values of each of the objects involved in the predicted collision at the time and/or location of that collision. This can effectively represent, for instance, a modified kinetic energy of the collision. This can optionally be scaled (as shown by factor "a" in FIG. 3E), such as based on any or all of: an angle between heading values of the involved objects (e.g., as shown in FIG. 3A, such that head-on collisions have an increased energy value relative to rear-end collisions, etc.); the types of objects involved (e.g., ego vehicle colliding with a pedestrian has a higher energy than another vehicle); a likelihood of the collision actually occurring; and/or any other factors (e.g., as described below). The velocity values used in the calculation (e.g., as shown in Dataset 1_1 in FIG. 3D) are preferably produced in the $1^{st}$ subset of simulations and optionally selected based on location information calculated from the $2^{nd}$ subset of simulations, but can alternatively be selected based on information from the $1^{st}$ subset (e.g., location of collision, velocity immediately before velocity of involved objects starts decreasing and/or falls to zero), and/or otherwise suitably selected.

Figure 3E:
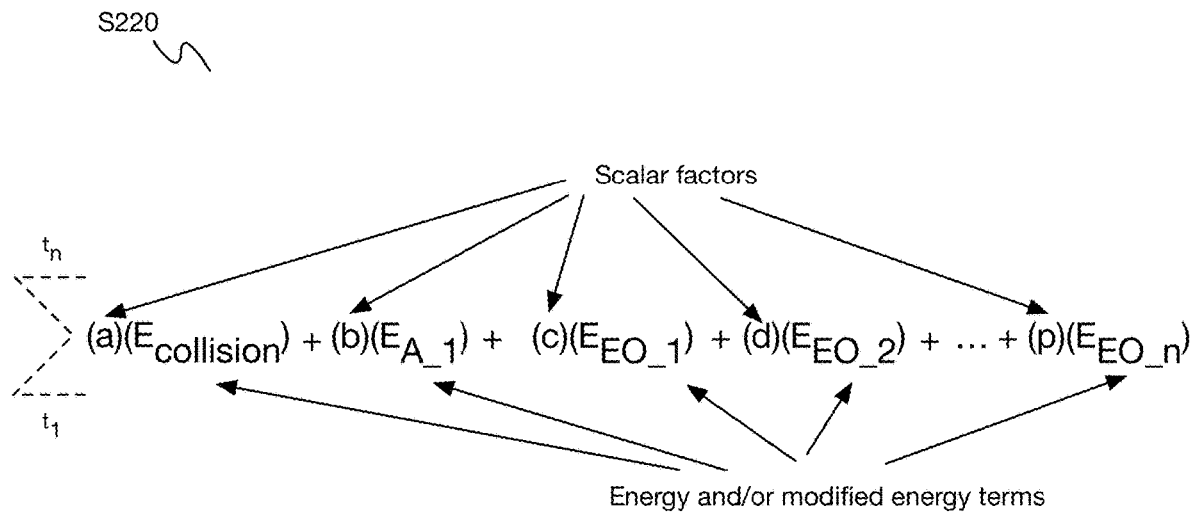

In an example, for instance, as shown in FIGS. 3A-3F, a collision between the ego vehicle (A_1) and another vehicle (EO_2) is identified as occurring at time $t=t_3$ and at a location of $L=L_{17}$ in the $1^{st}$ simulation, wherein the energy of the collision is calculated based on the velocities of these agents ($V_{22}$ and $V_9$, respectively) at the time and/or location of the collision. In a specific example, $E_{collision}$ in FIG. 3E is calculated as $(V_{22})^2+(V_9)^2$, which can then be optionally scaled by a scaling factor "a" (or scaling factors for each of the velocity-squared terms).

The non-collision energy metrics that might be calculated in determining a risk metric preferably indicate a potential for the ego vehicle and/or other objects to introduce energy into the environment, and are further preferably calculated in an event that one or more other risk types are detected in the $1^{st}$ type of simulations. These energy metrics are preferably associated with individual objects, but can additionally be associated with combinations of objects (e.g., all objects predicted to be present in a conflict zone concurrently). The non-collision energy metrics can additionally function to enable uncertainties associated with the simulations to be accounted for, effectively ensuring that worst-case scenarios are accounted for while preventing the vehicle from constantly stopping or otherwise halting progress.

These non-collision energy metrics (equivalently referred to herein as potential energy metrics and/or relative energy metrics) are preferably calculated based on a difference in parameter values (e.g., velocities) between different types of simulations, and further preferably wherein: the energy metrics for non-ego objects are calculated based on data in the $1^{st}$ subset of simulations and the $1^{st}$ type of the $2^{nd}$ subset (where the ego vehicle is absent), which can enable the effect of the ego vehicle to be represented; and the energy metrics for the ego vehicle are calculated based on data in the $1^{st}$ subset of simulations and the $2^{nd}$ type of the $2^{nd}$ subset (where only the ego vehicle is present).

Analyzing a difference between simulation types functions to reflect a relative risk of objects not properly reacting to the actions of other objects. For instance, in comparing velocities (or other parameters) between simulations with all objects present ($1^{st}$ subset) and those with the ego vehicle absent, the effect of the non-ego objects reacting to the ego vehicle (aka the effect of the ego vehicle on the other objects) can be quantified (since the ego vehicle is the only factor that can account for those differences). Similarly in comparing velocities (or other parameters) between simulations with all objects present ($1^{st}$ subset) and those with only the ego vehicle present, the effect of the ego vehicle reacting to the non-ego objects (aka the effect of the non-ego objects on the ego vehicle) can be quantified (since the other objects are the only difference between the outcomes). This can further function to account for uncertainties in how objects will react (e.g., will the other objects properly slow down, are drivers of the other objects paying attention or not, etc.), uncertainties in the simulations (e.g., what will happen if the simulations have errors and the object we think is next to the ego vehicle is actually cutting in front of the ego vehicle), and/or any other features.

In some variants, for instance, the potential energy associated with multiple objects being present in a conflict zone (e.g., at the same time, with overlapping paths, etc.) is calculated, for each object in the conflict zone, by calculating the difference in squared-velocity at commensurate locations (e.g., between the $1^{st}$ subset of simulations and the simulation in the $2^{nd}$ subset that includes that object) and optionally scaling this number. These potential energies can then be aggregated in calculating the overall risk metric.

Alternatively, the difference in velocity can be calculated first and then squared, and then optionally scaled.

Additionally or alternatively, for conflict zones, rather than a difference in squared-velocity, the velocity value from the $1^{st}$ subset of simulations can be used (e.g., squared and multiplied by a scaling factor) for each object in calculating the potential energy. This can optionally differ from the collision metric by scaling this value (e.g., by a time gap between when the objects are predicted to reach the same location, by a distance between the objects once in the conflict zone, etc.).

In some variants, both the velocity values from a single simulation and the differences in velocities between simulation types are used to assess the risks of a conflict zone.

For clearance type risks, the associated energy metric is preferably calculated based on differences in velocity of the ego vehicle between the $1^{st}$ subset of simulations and the simulation of the $2^{nd}$ subset in which only the ego vehicle is present. This reflects the magnitude of "energy" with which the ego vehicle is moving, effectively how fast the ego vehicle is moving toward an object that the ego vehicle has poor clearance with (which might change in the future). This can help motivate (e.g., in S300) the ego vehicle to select policies which increase this distance.

In preferred variants, this is calculated by finding the difference in squared velocity for the ego vehicle between simulations, and optionally scaling this number. Alternatively, the velocity difference can be scaled, and/or any other parameters can be calculated.

For objects that do not pose a risk, no energy metric is preferably calculated. alternatively, the energy can be calculated and scaled down (e.g., to zero). Additionally or alternatively, for risks to objects at which the non-ego has no fault (e.g., for objects trailing the ego, for objects that do not have right-of-way in a particular situation, etc.), the energy metric for that object can be calculated and optionally scaled down (e.g., decreased, scaled to zero, etc.).

In preferred variations, the risk metric (e.g., at any given time, for any given simulation/election cycle, etc.) includes a summation of energy values (e.g., scaled velocity derivatives), such as that shown in FIG. 3E.

Additionally or alternatively, the risk metric can include a maximum risk value and/or any other metrics.

Figure 3F:
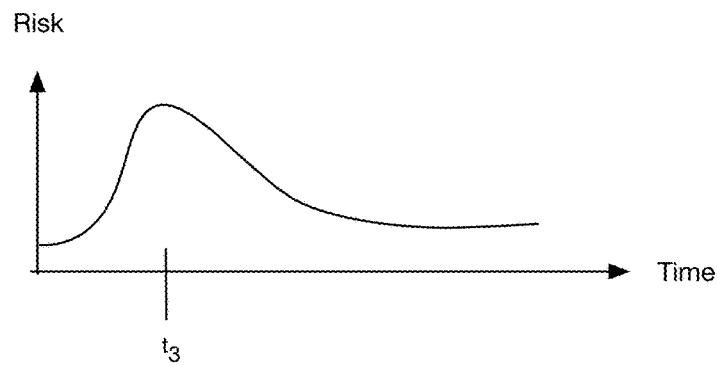

In some examples, the risk metrics at each time are calculated and collectively form a risk profile (e.g., as shown in FIG. 3F), which can be used in S300 to utilize information regarding how far in the future a risk is expected (such that risks can be mitigated rather than immediately reacted to).

In a variant (e.g., as shown in FIG. 3E), a risk metric (e.g., at each time, summed over all future times represented in the forward simulation, etc.) and/or risk profile (e.g., as shown in FIG. 3F) is calculated based on a set of energy values, wherein the energy values are calculated based on data from any or all of the sets of simulations. These energy values preferably include the energy metrics resulting from any or all of the risk types (e.g., as described above), but can additionally or alternatively reflect any other risk types and/or be otherwise suitably calculated.

In additional or alternative variations, the risk metric includes a set of energy values aggregated with a set of work values. In an example, for instance, the risk metric includes any calculated energy metrics (e.g., kinetic energy, scaled kinetic energy, etc.) aggregated with any work metrics occurring in the scenario (e.g., work required by objects to prevent a risk). In some examples, for instance, the simulation can demonstrate how if the ego vehicle engages in an overly conservative behavior immediately (e.g., stops immediately because a potential collision may occur), it might actually increase the overall total energy of the system (e.g., due to the amount the ego vehicle would have to brake, due to the amount of work other vehicles would have to spend in stopping because of the ego vehicle stopping, etc.) more than a potential hazardous event (e.g., ego vehicle hitting a curb).

The risk metric and/or components of the risk metric (e.g., individual energy metrics) can optionally be scaled and/or weighted with any number of scaling factors (e.g., as indicated by "a," "b," "c," "d," and "p" in FIG. 3E), which can function to accurately reflect the most important risks, enable comparisons between types of risks, and/or otherwise guide the vehicle to most optimally respond to risks in S300.

The scaling factor can optionally be determined based on a level (e.g., magnitude) of potential harm resulting from the a risk. For instance, the scaling factors can increase the magnitude of the risk metric for a collision of the ego vehicle depending on a classification of object type. For instance, a scaling factor can increase the risk (e.g., energy metric, "a", etc.) with a pedestrian, which would have a higher likelihood to cause harm as compared with a collision between an ego vehicle and a more rigid object (e.g., other vehicle, static object, etc.). In examples, for instance, an object softness (e.g., produced through a classification of the object with the ego vehicle's perception subsystem) and/or object humanness (e.g., pedestrian, vehicle with a pedestrian, biker, number of anticipated humans involved, etc.) can be used to scale the risk metric (e.g., modified kinetic energy metric). Additionally or alternatively, any other features or information can be used to scale the energy metric, such as, but not limited to: a type of predicted impact, a location of a predicted impact (e.g., rear-end collision, head-on collision, etc.), and/or any other features. Additionally or alternatively, a predicted or identified mass of the object can be utilized, and/or any other features of the objects.

The scaling factor can additionally or alternatively be determined based on driving conventions associated with the positions and movements of objects (e.g., as determined in the $1^{st}$ subset of simulations). For instance, in an event that an object is trailing the ego vehicle (e.g., within clearance guidelines, outside of clearance guidelines [e.g., tailgating]), etc.), the potential energy of that trailing object can be scaled down (or not calculated), since the driving convention prescribing trailing agents is that the trailing agent is at fault for rear-ending a leading agent (and/or because a trailing agent is likely to properly react to the behavior of a leading agent as the leading agent is in their direct field-of-view). Additionally or alternatively, conventions relating to 4-way stops, common courtesies, or any other scenarios can be used to scale the risk metric(s). Additionally or alternatively, objects can be eliminated from further consideration based on these driving conventions.

The scaling factor can additionally or alternatively be determined based on an angle of impact or predicted impact between objects, such that more severe angles of impact (e.g., T-bone collisions, head-on collisions, etc.) increase a value of the associated risk. In some variants, this applies to risks from collisions and conflict zones, but can additionally or alternatively apply to other risk types, all risk types, and/or any other types of risks. The angle of impact is preferably determined based on (e.g., corresponds to, is calculated based on, etc.) a difference in heading angles between objects (e.g., as shown in FIG. 3A), but can additionally or alternatively be otherwise suitably calculated. In some variants, for instance, an angle of 180-degrees (head-on collision) scales the relevant term maximally, while an angle of 0 degrees (or 360 degrees) scales the relevant term minimally, but any angle can scale the metric in any suitable way(s).

The scaling factor can additionally or alternatively be determined based on a probability of a risk (e.g., collision risk, non-collision risk, collective risk, etc.) occurring. This probability is preferably calculated based on data (e.g., positions, velocities, etc.) from the $1^{st}$ subset of simulations, but can additionally or alternatively be determined based on a simulation of the $2^{nd}$ subset, historical simulations, historical recorded data, current recorded data, a current policy of the ego vehicle (e.g., following a leading vehicle), and/or any other data.

The probability can be used to assess, for instance, given the uncertainty on where other objects are located, a scaling factor (or additional metric) can be calculated that represents this probability. This can represent, for instance, how likely it is that an object is actually in the path of another object (e.g., ego vehicle). If it is a high probability (aka a reliable prediction), then the simulated reaction is likely to occur. If this probability is lower (e.g., other object is sitting on the edge of a lane, weaving in and out of a lane, etc.), then there might be lower confidence in the associated energy metrics (aka how the ego or other objects will actually react). For instance, in such a scenario, another object might not actually be in the way of the ego agent and the ego agent could ultimately safely pass them (effectively down-scaling the risk).

In some examples, for instance, a potential energy of the ego vehicle can be scaled to reflect how likely it is that the ego vehicle would actually have that potential energy given the uncertainty in its environment (e.g., how many other objects are present, where the other objects are located, how fast the other objects are traveling, etc.). Potential energies for other objects can additionally or alternatively be calculated, In a specific example, for instance, in the event that the ego vehicle is following an object in front of it, the potential energy might be more certain than if objects are weaving in and out of its lane.

For collision risks, a likelihood of the collision can additionally or alternatively be determined and used to scale the energy of the collision.

The scaling factor can additionally or alternatively be scaled by one or more distance values, such as the simulated distances between objects (e.g., in a conflict zone, outside of a conflict zone, when trailing, etc.), where the lesser the distance value, the less risk a potential risk poses.

The scaling factor can additionally or alternatively be scaled by one or more temporal factors, such as: a time gap between objects (e.g., time between when objects are predicted to be in the same location in a conflict zone, time gap between a leading and trailing object, etc.); a time at which a risk is predicted to occur; and/or any other temporal parameters. The temporal factors can be determined based on a simulation, based on a risk profile, and/or otherwise suitably determined.

Additionally or alternatively, scalar factors can be determined based on any other features or information.

S220 can optionally include determining whether or not a detected potential hazardous event can be prevented and/or mitigated (e.g., reasonably prevented), such as through one or more actions of the other environmental objects and/or the ego vehicle. This functions to determine whether or not the ego vehicle needs to respond to the potential risk immediately, or if there is time to wait and see how the environment evolves (e.g., how the environmental objects behave). This can be integrated into the scaling factor, taken into account in S300 through the risk profile, and/or otherwise suitably utilized.

The preventability of a risk is preferably determined at least in part based on a time associated with the risk (e.g., and comparing with a threshold, and scaling the risk, etc.), but can additionally or alternatively be determined based on calculating a predicted ability for other objects to stop or otherwise react (e.g., stopping time, braking limits, etc.).

In some variants, for instance, a preventability of a risk from a conflict zone is calculated based on a time gap between object positions in a conflict zone.

Additionally or alternatively, determining if a risk can be prevented and/or mitigated can include calculating the value of a work metric (e.g., work, force multiplied by displacement, modified work, scaled and/or weighted work, relative work, etc.) that would need to be exerted by/performed by environmental objects and/or the ego vehicle, individually and/or collectively (e.g., by all environmental agents, by all environmental agents and the ego vehicle, etc.), in order to prevent the identified event from occurring. The work metrics preferably have the same units as the energy metrics (e.g., as described above), such that the work and energy metrics can be any or all of: aggregated, compared, and/or otherwise used. Based on these calculations of work, other parameters—such as those related to control commands of vehicles and/or temporal parameters—can be calculated and compared with thresholds (e.g., predetermined thresholds, class-label-specific thresholds, etc.) in order to determine how feasible it would be for the identified event to be avoided.

In an example, for instance, in an event that a potential hazardous event is detected, the amount of work required by each of the involved objects (e.g., environmental agents, ego vehicle, etc.) to avoid the hazardous event is calculated (e.g., based on the $1^{st}$ subset of simulations, based on the $1^{st}$ and $2^{nd}$ subsets of simulations, etc.). Based on these work metrics, a level of braking required to perform this amount of work can be calculated for each of the involved vehicles (e.g., cars, bikes, etc.) and compared with one or more braking thresholds (e.g., braking force, braking magnitude, etc.) to determine if and/or to what extent it would be possible for the vehicles to stop and avoid the event (e.g., wherein if the level of braking is below a predetermined threshold it is determined that the vehicle could stop, wherein if the level of braking is above a predetermined threshold it is determined that the vehicle could not stop, etc.). Additional or alternative to a braking level, any other metrics can be calculated, such as, but not limited to: a braking rate, a braking distance, a stopping distance, an acceleration and/or deceleration rate, a response time (e.g., to be compared with average human response times), the effect of changing heading (e.g., whether or not it would be possible to swerve to avoid an event), and/or any other metrics.

The amount of work can optionally be calculated in a relative fashion, such as a difference between work in the $1^{st}$ subset of simulations and work in the $2^{nd}$ subset of simulations, and/or in any other ways.

Additionally or alternatively, the risk metrics can be otherwise suitably calculated.

S220 can optionally include aggregating the energy metrics and the work metrics, such as to calculate an overall energy associated with a potential hazardous event (e.g., kinetic energy of a collision aggregated with the amount of work that vehicles not involved in the collision would need to exert to stop or slow down due to the collision). Further additionally or alternatively, any or all metrics can be aggregated with and/or compared with metrics from the $3^{rd}$ subset of simulations (e.g., kinetic energy aggregated with work and/or potential energy, etc.).

Additionally or alternatively, determining if a potential hazardous event can be prevented can include comparing energy and/or work metrics (e.g., modified kinetic energy, relative modified kinetic energy, work, aggregated work and energy, etc.) with one or more predetermined thresholds, and/or any other processes.

S220 can optionally include discounting any or all metrics (e.g., energy metrics, work metrics, overall cost metric, etc.) in response to determining that the potential hazardous event can be avoided (e.g., by actions of the ego vehicle, by actions of other agents, by actions of the ego vehicle and other agents, etc.). This functions to discount the risk (e.g., not respond to the risk immediately, wait for additional information, etc.) in the ego vehicle's decision-making. Additionally or alternatively, S220 can include otherwise triggering an outcome which is used in the ego vehicle's decision-making.

In a set of examples for instance, in an event that it is determined that the risk is close enough in the future that it cannot be avoided and/or cannot be avoided in an acceptable way (e.g., according to a set of criteria and/or thresholds), the risk will persist in the vehicle's decision-making (e.g., in S300, becoming a huge negative score such that the ego vehicle will not select the associated policy that results in the risk unless it is the best case risk [e.g., lowest modified kinetic energy] from policies that all result in risk, etc.), and in an event that the risk is determined to be far enough away in the future for the ego vehicle and/or environmental objects to respond (e.g., in an acceptable way), the risk can be ignored and/or down-weighted in the vehicle's decision-making (e.g., thereby preventing the ego vehicle from engaging in an overly conservative and/or premature behavior).

In a first variant of S200 (e.g., as shown in FIGS. 3A-3F), a collision is detected in the $1^{st}$ subset of simulations (between A_1 and EO_2), a modified kinetic energy of the collision (e.g., relative energy transfer between objects with conservation of momentum) is calculated and contributes to the overall risk. This modified kinetic energy is preferably calculated based on the velocity values from the $1^{st}$ subset of simulations for the objects involved in the collision (e.g., sum of squared-velocities of the involved objects), and can additionally be determined based on (e.g., scaled based on) angles and/or directions of the objects (e.g., heading of objects at/before collision), types of objects involved, and/or any other features. For the object behind the ego vehicle (EO_1), when taking into account driving rules/conventions, it can be determined that since EO_1 is trailing the ego vehicle (and is not located within a conflict zone), its potential energy does not need to be calculated (or can be calculated and down-scaled). Alternatively, because EO_1 is going to enter a conflict zone, its potential energy can be calculated. Since EO_n is present in the conflict zone, its potential energy can be calculated (and optionally scaled to reflect that EO_n is a pedestrian). In the example shown in FIGS. 3A-3B, the pedestrian has the same velocity between simulations at each location, and therefore, the potential energy would be zero.

Additionally, potential energies can be calculated for A_1 and/or EO_2 to reflect that they are both in the same conflict zone (e.g., in case the collision does not occur but a near-miss collision does).

In calculating potential energies, the $2^{nd}$ subsets of simulations, which produce Datasets 2_1 and 2_2, are preferably used to determine the locations of the objects, which are then used to find corresponding locations in the data from the $1^{st}$ subset of simulations (Dataset 1_1) (highlighted in gray), thereby enabling velocity differences to be calculated which correspond to the same locations.

These energies can then be summed together and/or over time to produce a parameter or set of parameters (e.g., as shown in FIG. 3E), a risk profile (e.g., as shown in FIG. 3F), or any combination of information.

Additionally or alternatively, S200 can include any other processes and/or be otherwise suitably performed.

3.3 Method—Operating the Ego Vehicle Based on the Assessed Risks S300

The method 200 can optionally include operating the ego vehicle based on the assessed risks S300, which functions to optimally respond to the risks based on the risk features characterized in S200. Additionally or alternatively, S300 can perform any other functions.

S300 is preferably performed during a multi-policy decision-making process of the ego vehicle (e.g., as described above), but can additionally or alternatively be performed in accordance with any other decision-making processes of the ego vehicle. In preferred variations, for instance, S300 includes selecting a policy from a set of policy options for the ego vehicle based on the assessed risks resulting from the set of simulations performed for each of the policy options.

S300 can optionally include calculating a reward metric, which functions to assess how much the ego vehicle would progress toward a goal (e.g., reduce its distance to a destination, obey traffic rules, etc.), which can optionally be incorporated in the decision-making (e.g., policy selection) of the ego vehicle.

In a first set of variations, the decision-making in S300 is performed in a hierarchical (e.g., decision tree) fashion, wherein a reward metric is only calculated in an event that no risks are detected in S200 and/or any risks detected in S200 can be avoided. In a set of examples, in an event that no potential hazardous event is detected, other lower tiers of events (e.g., legal risk events, comfort risk events, delay risk events, etc.) can be considered (e.g., prior to a reward metric).

In a second set of variations, a reward metric can be aggregated with one or more risk metrics (e.g., total energy, modified kinetic energy, modified kinetic energy aggregated with work, etc.) to determine an overall score for each policy.

S300 preferably includes selecting a policy (e.g., action, behavior, etc.) for the ego vehicle based on the risk and/or reward metrics and maneuvering the vehicle according to that policy.

This can include, for instance, assessing the risk over the whole simulation/policy rollout, such as aggregating risks over all time steps, discounting risks at future time steps if objects can brake sufficiently or otherwise avoid the risk, pushing risks farther into the future (e.g., by slowing down), and/or otherwise analyzing risk.

For instance, S300 can leverage the different simulation rollouts to estimate if the likelihood of a conflict is increasing or decreasing based on what the ego vehicle is doing or planning to do (e.g., by referencing historical rollouts and analyzing if the risk is going up or down), and selecting a policy based on that (e.g., changing to a new policy if the risk continues to increase with the same policy, maintaining a same policy if the risk continues to decrease, etc.).

Additionally or alternatively, risk can be otherwise suitably compared and selected among different policy options (e.g., as shown in FIG. 4).

Additionally or alternatively, S300 can include any other suitable processes.

The method 200 can additionally or alternatively include any other processes, such as, but not limited to, any or all of: repeating any or all of the above processes (e.g., to see if an avoidable risk evolves into an unavoidable risk, to see if an avoidable risk goes away, etc.), and/or any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for evaluating risk for a vehicle, the method comprising:
   at each of a set of times during operation of the vehicle:
      collecting a dataset of environmental information;
      identifying a set of environmental objects in an environment of the vehicle based on the dataset;
      simulating a set of future scenarios based on the dataset, the set of future scenarios comprising:
         a first scenario representing the environment;

a second scenario representing a first alteration of the environment;
a third scenario representing a second alteration of the environment;
based on the first scenario, identifying a set of risks;
calculating a set of metrics based on the set of risks and a set of velocity metrics associated with the set of future scenarios, wherein calculating the set of metrics comprises:
calculating a first set of metrics based on the first scenario;
calculating a second set of metrics based on the first scenario and at least one of the second or third scenario; and
controlling the vehicle according to the set of metrics.

2. The method of claim 1, wherein the set of risks comprises multiple categories of risk, the multiple categories of risk comprising a first category of risk, wherein the first category risk involves multiple objects of a set of objects, the set of objects comprising the vehicle and the set of environmental objects.

3. The method of claim 2, wherein the first category of risk comprises a simulated collision in the first scenario.

4. The method of claim 2, wherein the multiple categories of risk further comprises a second category of risk, wherein a metric of the second set of metrics calculated based on the second category is determined based only on movement of a single object of the set of objects.

5. The method of claim 4, wherein the second category of risk is not associated with a simulated collision.

6. The method of claim 1, wherein the second set of metrics comprises:
a first subset of metrics, the first subset of metrics determined based on velocity metrics from the first scenario and the second scenario; and
a second subset of metrics, the second subset of metrics determined based on velocity metrics from the first scenario and the third scenario.

7. The method of claim 6, wherein the second and third scenarios differ in which objects of a set of objects are represented in the respective scenario, wherein the set of objects comprises the vehicle and the set of environmental objects.

8. The method of claim 7, wherein in the second scenario, the vehicle is removed from the environment, and wherein in the third scenario, the set of environmental objects are removed from the environment.

9. The method of claim 1, wherein the method is performed in accordance with a single policy option of a set of multiple policy options for the vehicle.

10. The method of claim 9, further comprising repeating the method for each of a remainder of policy options in the set of multiple policy options, thereby producing a set of multiple aggregated risks, the set of multiple aggregated risks comprising the aggregated risk.

11. The method of claim 10, further comprising selecting a primary policy from the set of multiple policy options based on the set of multiple aggregated risks, and controlling the vehicle according to the primary policy.

12. The method of claim 1, wherein at least one of the multiple categories of risk is identified based on a set of predetermined zones in a labeled map.

13. The method of claim 12, wherein the category of risk is further identified based on a simulated co-location of the vehicle and an environmental object of the set of environmental objects in one of the set of predetermined zones during the first scenario.

14. The method of claim 1, further comprising applying a scaling factor to at least one of the set of metrics, wherein the scaling factor is determined based on at least one of:
a set of uncertainty values produced in simulating the first scenario;
a set of classifications associated with the set of environmental objects; and
a set of predetermined driving conventions.

15. A system for evaluating risk for a vehicle, the system comprising:
a set of sensors onboard the vehicle;
a set of processors in communication with the set of sensors, wherein the set of processors:
at each of a set of times during operation of the vehicle:
collects a dataset of environmental information from the set of sensors;
identifies a set of environmental objects in an environment of the vehicle based on the dataset;
with a simulator implemented by the set of processors, simulates a set of future scenarios based on the dataset, each of the set of future scenarios comprising a set of time points later than the time, the set of future scenarios comprising:
a first set of scenarios representing the environment;
a second set of scenarios representing one or more alterations of the environment;
based on the first scenario, identifies a set of risks;
calculates a set of metrics based on the set of risks, wherein calculating the set of metrics comprises:
calculating a first set of metrics based on the first set of scenarios;
calculating a second set of metrics based on the first set of scenarios and at least one of the second sets of scenarios;
aggregates the first and second sets of metrics to produce an aggregated risk;
implements operation of the vehicle according to the aggregated risk.

16. The system of claim 15, wherein the vehicle is an autonomous vehicle.

17. The system of claim 15, wherein the set of metrics is calculated based on a set of velocity metrics associated with the set of future scenarios, wherein each of the set of velocity metrics comprises a second derivative of a velocity value in the set of velocity values.

18. The system of claim 17, wherein a portion of the set of metrics is further calculated based on a difference in velocity metrics between two different scenarios of the set of future scenarios.

19. The system of claim 15, wherein the aggregated risk comprises a temporal risk profile.

20. The system of claim 15, wherein the second set of scenarios comprises a first scenario and a second scenario, wherein:
in the first scenario, movement of only the set of environmental objects is simulated; and
in the second scenario, movement of only the vehicle is simulated.

* * * * *